(12) United States Patent
Asao

(10) Patent No.: US 7,458,071 B2
(45) Date of Patent: Nov. 25, 2008

(54) COMPILATION METHOD, COMPILER APPARATUS AND COMPILER

(75) Inventor: Shinobu Asao, Sakai (JP)

(73) Assignee: Panasonic Corporation, Osaka (JP)

( * ) Notice: Subject to any disclaimer, the term of this patent is extended or adjusted under 35 U.S.C. 154(b) by 728 days.

(21) Appl. No.: 11/016,934

(22) Filed: Dec. 21, 2004

(65) Prior Publication Data

US 2005/0138612 A1    Jun. 23, 2005

(30) Foreign Application Priority Data

Dec. 22, 2003    (JP) .............................. 2003-424043

(51) Int. Cl.
    *G06F 9/45*    (2006.01)
(52) U.S. Cl. ...................... 717/152; 717/146; 717/153
(58) Field of Classification Search .................. 717/151
    See application file for complete search history.

(56) References Cited

U.S. PATENT DOCUMENTS 6,481,007 B1*   11/2002   Iyer et al. ................... 717/151

7,155,728 B1*   12/2006   Prabhu et al. ............... 719/316
2005/0071846 A1*  3/2005   Herschleb .................... 719/310

* cited by examiner

*Primary Examiner*—Tuan Q. Dam
*Assistant Examiner*—Isaac T Tecklu
(74) *Attorney, Agent, or Firm*—Wenderoth, Lind & Ponack, L.L.P.

(57) ABSTRACT

The compilation method, which allows a programmer to perform programming without minding about pass-by-reference, and offers efficiency in generating codes even in the case of using "pass by value", includes the following: generating intermediate codes from a source program; optimizing the intermediate codes by converting a procedure that calls a procedure with pass-by-value argument into a procedure that calls a procedure with pass-by-reference argument, in the case where there is no procedure that may indirectly call the procedure with pass-by-value argument, and the pass-by-value is not updated within the definition according to the procedure with pass-by-value argument; and converting the optimized intermediate codes into object codes.

19 Claims, 23 Drawing Sheets

Indirectly calling source program

```
#include "struct.h"

void func1(void (*p)(A))
{
  A x = {0,0,0};
  p(x);
  ...
} void func2(A obj)
{
  ...
} void func3(A obj)
{
  ...
} void func4(A obj)
{
  ...
}
```

FIG. 10A

```
⟨struct.h⟩ struct A {
   int x;
   int y;
   int z;
};
```

FIG. 10B

```
⟨prog1.cc⟩ include "struct.h"

void f(A obj)
{
   int a, b, c;
   a = obj.x;
   b = obj.y;
   c = obj.z;
   ...
} void g(void)
{
   A x = {0, 0, 0};
   f(x);
   ...
} void h(void)
{
   A y = {1, 1, 1};
   f(y);
   ...
}
```

FIG. 12

```
;;definition "void f(A obj)"
_f_F1A
        mov     SP, A0          ;;store "obj.x"
        add     16, A0          ;;stored in SP+16
        mov     (A0), D0        ;;into local variable "a"
        mov     D0, (SP)        ;;indicated by SP mov     SP, A0          ;;store "obj.y"
        add     16, A0          ;;stored in SP+(16+4)
        mov     (4, A0), D0     ;;into local variable "b"
        mov     D0, (4, SP)     ;;indicated by SP+4 mov     SP, A0          ;;store "obj.z"
        add     16, A0          ;;stored in SP+(16+8)
        mov     (8, A0), D0     ;;into local variable "c"
        mov     D0, (8, SP)     ;;indicated by SP+8
        ...

;;definition "void g(void)"
_g_Fv
        ...
        mov     SP, A0          ;;store local variable "x.x"
        add     16, A0          ;;stored in SP+16
        mov     (A0), D0        ;;into first argument storing area
        mov     D0, (4, SP)     ;;indicated by SP+4 mov     SP, A0          ;;store local variable "x.y"
        add     16, A0          ;;stored in SP+(16+4)
        mov     (4, A0), D0     ;;into first argument storing area
        mov     D0, (8, SP)     ;;indicated by SP+8 mov     SP, A0          ;;store local variable "x.z"
        add     16, A0          ;;stored in SP+(16+8)
        mov     (8, A0), D0     ;;into first argument storing area
        mov     D0, (12, SP)    ;;indicated by SP+12 call    _f_F1A          ;;call function "void f(A obj)"
        ...

;;definition "void h(void)"
_h_Fv
        ...                     ;;Same as definition "void g(void)"
```

FIG. 15

```
;;definition "void f(A obj)"
_f_F1A
        mov     SP, A0          ;;store "&obj" stored in SP+16
        add     16, A0          ;;into register A0
        mov     (A0), D0        ;;store value "(obj.x)" indicated by A0
        mov     D0, (SP)        ;;into local variable "a" indicated by SP mov     (4, A0), D0     ;;store value "(obj.y)" indicated by A0+4
        mov     D0, (4, SP)     ;;into local variable "b" indicated by SP+4 mov     (8, A0), D0     ;;store value "(obj.z)" indicated by A0+8
        mov     D0, (8, SP)     ;;into local variable "c" indicated by SP+8
        ...

;;definition "void g(void)"
_g_Fv
        ...
        mov     SP, A0          ;;store starting address (SP+8)
        add     8, A0           ;;where local variable "obj" is stored
        mov     A0, (4, SP)     ;;into first argument storing area
                                ;;indicated by SP+4 call    _f_F1A          ;;call function "void f(A obj)"
        ...

;;definition "void h(void)"
_h_Fv
        ...                     ;;Same as definition "void g(void)"
```

FIG. 16A

```
⟨class.h⟩ class A {
    int x;
    int y;
    int z;
public:
    A(void):x(0), y(0), z(0){}
    A(A &obj);
    int get_x(void)  {return x;}
    int get_y(void)  {return y;}
    int get_z(void)  {return z;}
    void set_x(int a)  {x=a;}
    void set_y(int a)  {y=a;}
    void set_z(int a)  {z=a;}
};
```

FIG. 16B

```
⟨prog2.cc⟩ include "class.h"

void f(A obj)
{
    int a;
    a = obj.get_x();
    b = obj.get_y();
    c = obj.get_z();
    ...
} void g(void)
{
    A x;
    f(x);
    ...
} void h(void)
{
    A y;
    f(y);
    ...
}
```

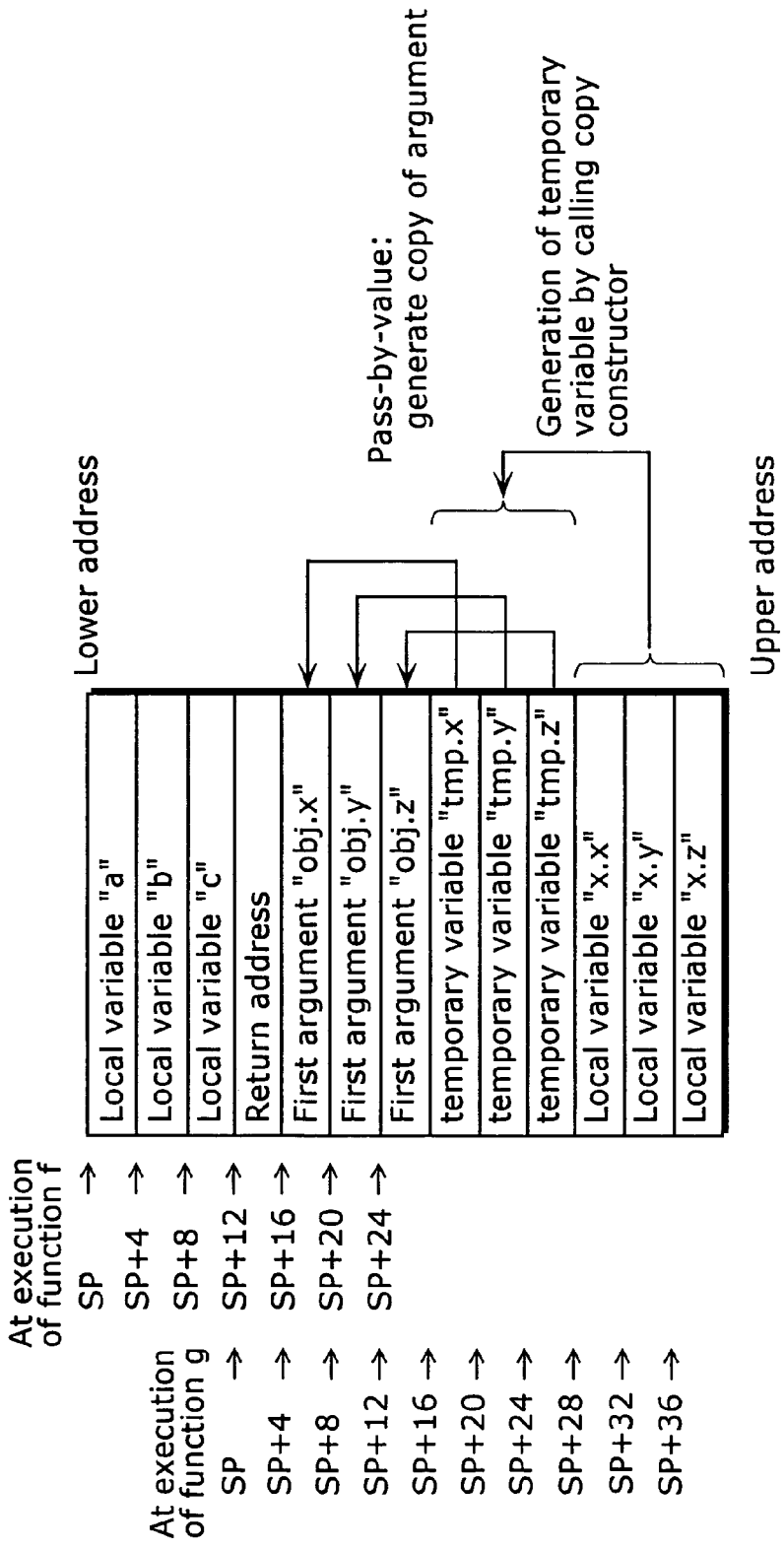

FIG. 18

```
;;definition "void f(A obj)"
_f_F1A
            mov     SP, A0          ;;store "obj.x"
            add     16, A0          ;;stored in SP+16
            mov     (A0), D0        ;;into local variable "a"
            mov     D0, (SP)        ;;indicated by SP mov     SP, A0          ;;store "obj.y"
            add     16, A0          ;;stored in SP+(16+4)
            mov     (4, A0), D0     ;;into local variable "b"
            mov     D0, (4, SP)     ;;indicated by SP+4

;;store "obj.z"
            mov     SP, A0          ;;stored in SP+(16+8)
            add     16, A0          ;;into local variable "c"
            mov     (8, A0), D0     ;;indicated by SP+8
            mov     D0, (8, SP)
            ...

;;definition "void g(void)"
_g_Fv
            ...
            call    _ct_1AR1A       ;;call copy constructor
            ...                     ;;generate copy of local variable "x"
            ...                     ;;store temporary variable storing area mov     SP, A0          ;;store value of temporary variable "tmp.x"
            add     16, A0          ;;stored in SP+16
            mov     (A0), D0        ;;into first argument storing area
            mov     D0, (4, SP)     ;;indicated by SP+4

;;store value of temporary variable "tmp.y"
            mov     SP, A0          ;;stored in SP+(16+4)
            add     16, A0          ;;into first argument storing area
            mov     (4, A0), D0     ;;indicated by SP+8
            mov     D0, (8, SP)
                                    ;;store value of temporary variable "tmp.z"
                                    ;;stored in SP+(16+8)
            mov     SP, A0          ;;into first argument storing area
            add     16, A0          ;;indicated by SP+12
            mov     (8, A0), D0
            mov     D0, (12, SP)

;;call function "void f(A obj)"
            call    _f_F1A
            ...

;;definition "void h(void)"
_h_Fv
            ...                     ;;Same as definition "void g(void)"
```

FIG. 20A

```
<struct.h> struct A {
   int x;
   int y;
   int z;
};
```

FIG. 20B

```
<prog3.cc> include "struct.h"

void f(A obj)
{
   int a,b,c;
   a = obj.x;
   b = obj.y;
   c = obj.z;
   obj.x = b;
   obj.y = c;
   obj.z = a;
   ...
} void g(void)
{
   A x = {0,0,0};
   f(x);
   ...
} void h(void)
{
   A y = {1,1,1};
   f(y);
   ...
}
```

FIG. 21

```
;;definition "void f(A obj)"
_f_F1A
        mov     SP, A0          ;;store "obj.x"
        add     16, A0          ;;stored in SP+16
        mov     (A0), D0        ;;into local variable "a"
        mov     D0, (SP)        ;;indicated by SP mov     SP, A0          ;;store "obj.y"
        add     16, A0          ;;stored in SP+(16+4)
        mov     (4, A0), D0     ;;into local variable "b"
        mov     D0, (4, SP)     ;;indicated by SP+4

;;store "obj.z"
        mov     SP, A0          ;;stored in SP+(16+8)
        add     16, A0          ;;into local variable "c"
        mov     (8, A0), D0     ;;indicated by SP+8
        mov     D0, (8, SP)

;;store local variable "b" stored in SP+4
        mov     SP, A0          ;;into SP+16 where "obj.x" is stored
        add     4, A0
        mov     (A0), D0
        mov     D0, (16, SP)
                                ;;store local variable "c" stored in SP+8
        mov     SP, A0          ;;into SP+(16+4) where "obj.y" is stored
        add     8, A0
        mov     (A0), D0
        mov     D0, (20, SP)    ;;store local variable "a" stored in SP
                                ;;into SP+(16+8) where "obj.z" is stored mov     SP, A0
        mov     (A0), D0
        mov     D0, (24, SP)

;;definition "void g(void)"
_g_Fv
        mov     SP, A0          ;;store local variable "x.x"
        add     16, A0          ;;stored in SP+16
        mov     (A0), D0        ;;into first argument storing area
        mov     D0, (4, SP)     ;;indicated by SP+4 mov     SP, A0          ;;store local variable "x.y"
        add     16, A0          ;;stored in SP+(16+4)
        mov     (4, A0), D0     ;;into first argument storing area
        mov     D0, (8, SP)     ;;indicated by SP+8

;;store local variable "x.z"
        mov     SP, A0          ;;stored in SP+(16+8)
        add     16, A0          ;;into first argument storing area
        mov     (8, A0), D0     ;;indicated by SP+12
        mov     D0, (12, SP)
                                ;;call function "void f(A obj)"
        call    _f_F1A
        ...

;;definition "void h(void)"
_h_Fv
        ...                     ;;Same as definition "void g(void)"
```

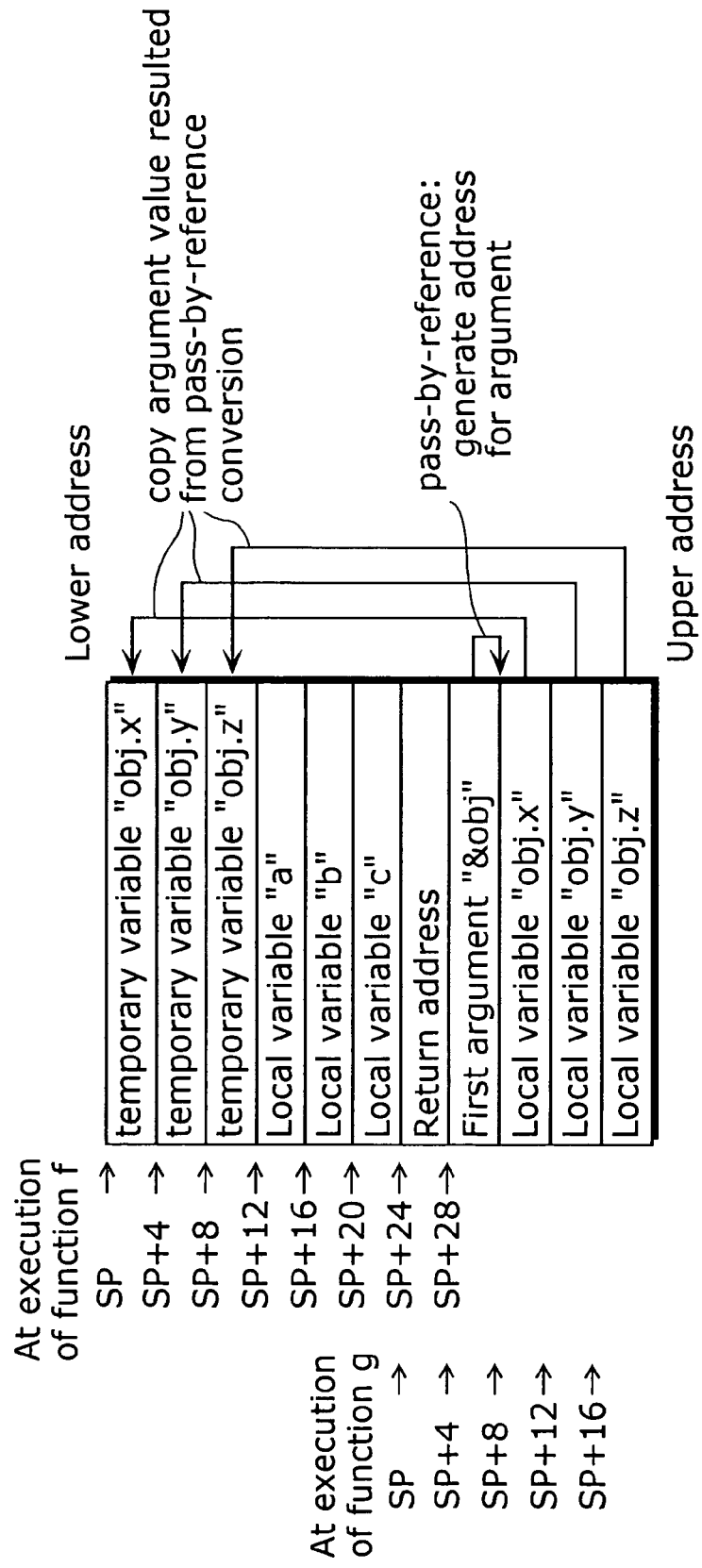

FIG. 24

```
;;definition "void f(A obj)"
_f_F1A
    mov   SP, A0        ;;store "&obj" stored in SP+28
    add   28, A0        ;;into register A0 mov   (A0), D0      ;;store value "(obj.x)" indicated by A0
    mov   D0, (SP)      ;;into temporary variable storing area indicated by SP mov   (4, A0), D0   ;;store value "(obj.y)" indicated by A0+4
    mov   D0, (4, SP)   ;;into temporary variable storing area indicated by SP+4 mov   (8, A0), D0   ;;store value "(obj.z)" indicated by A0+8
    mov   D0, (8, SP)   ;;into temporary variable storing area indicated by SP+8 mov   (SP), D0      ;;store temporary variable in area for local variable "a"
    mov   D0, (12, SP)

mov   (SP+4), D0    ;;store temporary variable in area for local variable "b"
    mov   D0, (16, SP)

mov   (SP+8), D0    ;;store temporary variable in area for local variable "c"
    mov   D0, (20, SP)
    ...
    mov   SP, A0        ;;store local variable "b" stored in SP+16
    add   16, A0        ;;into temporary variable storing area SP for "obj.x"
    mov   (A0), D0
    mov   D0, (SP)

mov   SP, A0        ;;store local variable "c" stored in SP+20
    add   20, A0        ;;into temporary variable storing area SP+4 for "obj.y"
    mov   (A0), D0
    mov   D0, (4,SP)

mov   SP, A0        ;;store local variable "a" stored in SP+12
    add   12, A0        ;;into temporary variable storing area SP+8 for "obj.z"
    mov   (A0), D0
    mov   D0, (8,SP)
;;definition "void g(void)"
_g_Fv
    ...
    mov   SP, A0        ;;store starting address (SP+8)
    add   8, A0         ;;stored in local variable "obj"
    mov   A0, (4, SP)   ;;into first argument storing area
                        ;;indicated by SP+4 call  _f_F1A        ;;call function "void f(A obj)"
    ...
;;definition "void h(void)"
_h_Fv
    ...               ;;Same as definition "void g(void)"
```

COMPILATION METHOD, COMPILER APPARATUS AND COMPILER

BACKGROUND OF THE INVENTION (1) Field of the Invention

The present invention relates to a compilation method, and in particular, to a compilation method for converting a source program which is written in an object-oriented language typified by a C++ language, into an object program.

(2) Description of the Related Art

In recent software development, an object-oriented language with high serviceability and reusability has come to attract attention along with a tendency for large-scaled programs. A C++ language is a representative example of the object-oriented language. The C++ language is a language whose specification is extended so that a program can be naturally described in a object-oriented manner in a C language that is a high-level language with an excellent portability. A function is defined using the C++ language in a program, and is called at the right stage so that the processing defined by the function is executed. Two ways are provided here as a method to pass an argument to the function: "pass by value"; and "pass by reference (i.e. pass by pointer)".

In the conventional C++ language, in the case where an argument is given to a function, a copy of the given argument is generated, and then, stored in a memory. In the case of using the "pass by value", on one hand, an object to be given as an argument is completely copied, and then, the copy of the argument is stored in the memory. For example, in the case of passing a class object, processing of generating a copy of the class object is firstly executed, and then, the generated class object is stored in the memory. On the other hand, in the case of using the "pass by reference", an object to be passed is a pointer value (i.e., an address value of an object), therefore, the pointer value is copied and stored in the memory.

It should be noted that the copy of the class object in the "pass by value" may implicitly call many copy constructors, which may be a cause of increase in code size resulted from compilation. In general, codes can be effectively generated by employing "pass by reference" rather than "pass by value". Therefore, it is considered as important that a programmer performs programming with the "pass by reference" in mind.

This assumption, however, cannot but force the programmer to perform programming so that the codes are efficiently generated.

The use of "pass by reference" may cause a problem of aliasing (a risk of unintentionally changing a status of an object due to a use of plural names for a single object). This causes a problem that bugs can easily enter the program.

SUMMARY OF THE INVENTION

The present invention is conceived in view of the above problems, and an object of the present invention is to provide a compilation method that achieves a high efficiency in code generation even in the case where programming is performed based on "pass by value", so that a programmer does not need- to mind about "pass by reference" in the process of programming.

The compilation method according to a certain aspect of the present invention is a compilation method for converting a source program written in a high-level language into object codes, comprising: generating intermediate codes from the source program; optimizing the intermediate codes by converting a pass-by-value argument into a pass-by-reference argument, in the case where both of the following conditions are satisfied: there is no procedure that may indirectly call a procedure with pass-by-value argument; and the pass-by-value argument is not updated within a definition according to the procedure with pass-by-value argument; and converting the optimized intermediate codes into object codes.

According to this method, even when the programmer writes a program that is based on "pass by value", the program can be converted into the one that is written with the basis on "pass by reference". This means that the programmer no longer needs to mind about "pass by reference" in the programming. Therefore, the programmer is not forced to perform programming in which efficiency in code generation is taken into account, and it is less easy for the bugs to enter the program.

More preferably, in the optimizing, in the case where both of the following conditions are satisfied: there is no procedure that may indirectly call a procedure with pass-by-value argument; and the pass-by-value argument is not updated within the definition according to the procedure with pass-by-value argument, the intermediate codes are optimized by converting the procedure that calls a procedure with pass-by-value argument into a procedure that calls a procedure with pass-by-reference argument. The optimizing further includes: extracting pass-by-value argument update information based on the intermediate codes, the information including at least the following: a procedure with pass-by-value argument; a procedure that directly calls the procedure with pass-by-value argument; a procedure that may indirectly call the procedure with pass-by-value argument; a pass-by-value argument of the procedure with pass-by-value argument; and update judgment information indicating whether or not the pass-by-value argument is updated within the definition according to the procedure with pass-by-value argument; and converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

More preferably, in the converting, when it is not specified to forcedly convert the procedure that directly calls a procedure with pass-by-value argument into the procedure that directly calls a procedure with pass-by-reference argument, a procedure with pass-by-value argument is converted into a procedure with pass-by-reference argument, in the case where the pass-by-value argument update information indicates that there is no procedure that may indirectly call a procedure with pass-by-value argument, and the pass-by-value argument is not updated within the definition according to the procedure with pass-by-value argument.

According to this method, in the case where the function with pass-by-value argument has not updated the argument within the definition, it is possible to delete redundant copy generation codes generated on the side of a function caller. Therefore, codes can be effectively generated.

More preferably, in the converting, when it is specified to forcedly convert a procedure that directly calls a procedure with pass-by-value argument into a procedure that directly calls a procedure with pass-by-reference argument, the following conversions are performed as specified for the procedure that directly calls a procedure with pass-by-value argument, based on the pass-by-value argument update information: the procedure that directly calls a procedure with pass-by-value argument is converted into the procedure that directly calls a procedure with pass-by-reference argument; and the procedure that may indirectly call a procedure with pass-by-value argument is converted into the procedure that may indirectly call a procedure with pass-by-reference argument.

According to this method, even in the case where the function with pass-by-value argument has updated the argument within the definition, it is possible to delete redundant copy generation codes generated on the side of a function caller. Therefore, codes can be effectively generated.

More preferably, in the optimizing, in the case where both of the following conditions are satisfied: there is no procedure that may indirectly call a procedure with pass-by-value argument; and a pass-by-value argument is not updated within the definition according to the procedure with pass-by-value argument, the intermediate codes are optimized by converting an argument passing with the use of pass-by-value into an argument passing with the use of pass-by-reference. The optimizing further includes: extracting pass-by-value argument update information based on the intermediate codes, the information at least including: a procedure with pass-by-value argument; a procedure that directly calls the procedure with pass-by-value argument; a pass-by-value argument of the procedure with pass-by-value argument; and update judgment information indicating whether or not the pass-by-value argument is updated within the definition according to the procedure with pass-by-value argument; and converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

More preferably, in the converting, when it is not specified to forcedly convert, for the procedure with pass-by-value argument, an argument passing with the use of pass-by-value into an argument passing with the use of pass-by-reference, an argument passing with the use of pass-by-value is converted into an argument passing with the use of pass-by-reference, in the case where the pass-by-value argument update information indicates that there is no procedure that may indirectly call a procedure with pass-by-value argument, and the pass-by-value argument is not updated within the definition according to the procedure with pass-by-value argument.

According to this method, in the case where the function with pass-by-value argument has not updated the argument within the definition, the quality of the access to the argument within the definition according to the function with pass-by-value argument is as same as that of the access to the argument within the definition according to the function with pass-by-reference. Therefore, codes can be effectively generated.

More preferably, in the converting, when it is specified to forcedly convert, for the procedure with pass-by-value argument, an argument passing with the use of pass-by-value into an argument passing with the use of pass-by-reference argument, an argument passing with the use of pass-by-value is converted into an argument passing with the use of pass-by-reference, as specified for the procedure with pass-by-value argument, and in the case where the pass-by-value argument is updated within the procedure definition, an argument value is referred to from the converted pass-by-reference argument so as to generate a copy of the argument value, in the intermediate codes, at a location before a part where a value is actually updated, and the location where the copy is generated is set as a reference.

According to this method, even in the case where the function with pass-by-value argument has updated the argument, the quality of the access to the argument within the definition according to the function with pass-by-value argument is as same as that of the access to the argument within the definition according to the function with pass-by-reference. Therefore, codes can be effectively generated.

The present invention can be realized not only as the compilation method having such characteristic steps as described above, but also as a compiler apparatus having, as units, the characteristic steps included in the compilation method, and even as a compiler that causes a computer to execute the characteristic steps. Such compiler can be surely distributed via a storage medium such as a Compact Disc-Read Only Memory (CD-ROM) or a transmission medium such as the Internet.

According to the compilation method of the present invention, a programmer does not need to be conscious of "pass-by-reference" when programming.

Even in the case of using "pass by value", object codes can be generated in small code size.

It should be noted that the same effects can be obtained even in the case where a source program is described using assembler codes that complies with either of the following: optimizing intermediate codes by converting the function that calls the function with pass-by-value argument into the function that calls the function with pass-by-reference argument; or optimizing intermediate codes by converting, for the function with pass-by-value argument, the argument passing that uses "pass-by-value" into the argument passing that uses "pass-by-reference".

FURTHER INFORMATION ABOUT TECHNICAL BACKGROUND TO THIS APPLICATION

The disclosure of Japanese Patent Application No. 2003-424043 filed on Dec. 22, 2003, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a diagram showing an example of the source program that includes a function that may indirectly call a pass-by value function;

FIG. 10A shows an example of the header file stored in the program storing unit used in a first concrete example;

FIG. 10B shows an example of the source program stored in the program storing unit used in the first concrete example;

FIG. 12 shows an example of the assembler codes in the case of compiling the files shown in FIGS. 10A and 10B using the conventional method;

Figure 13:
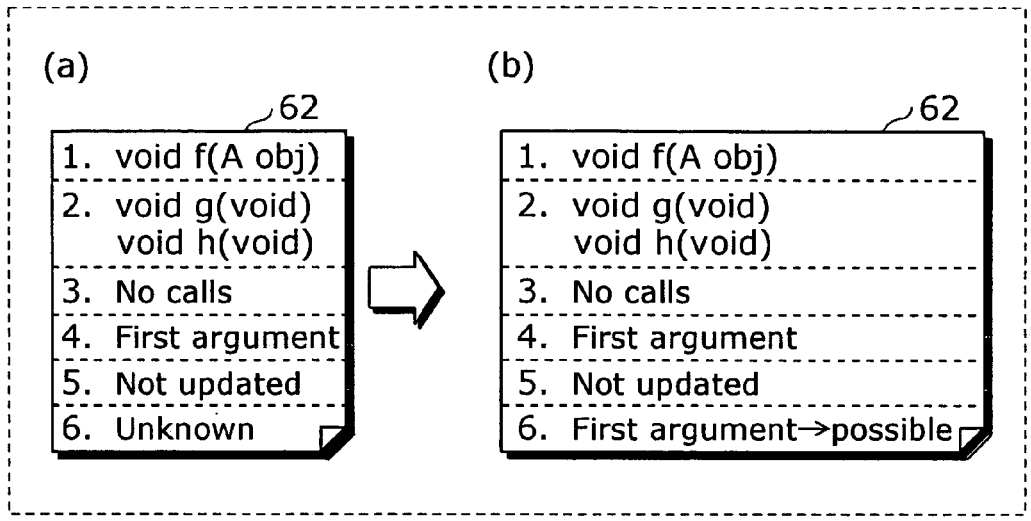
Figure 14:
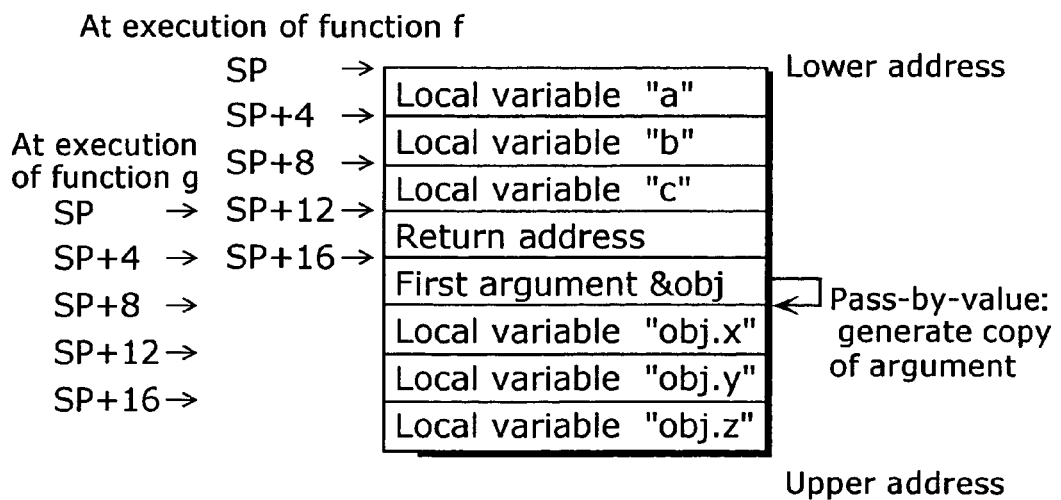
Figure 19:
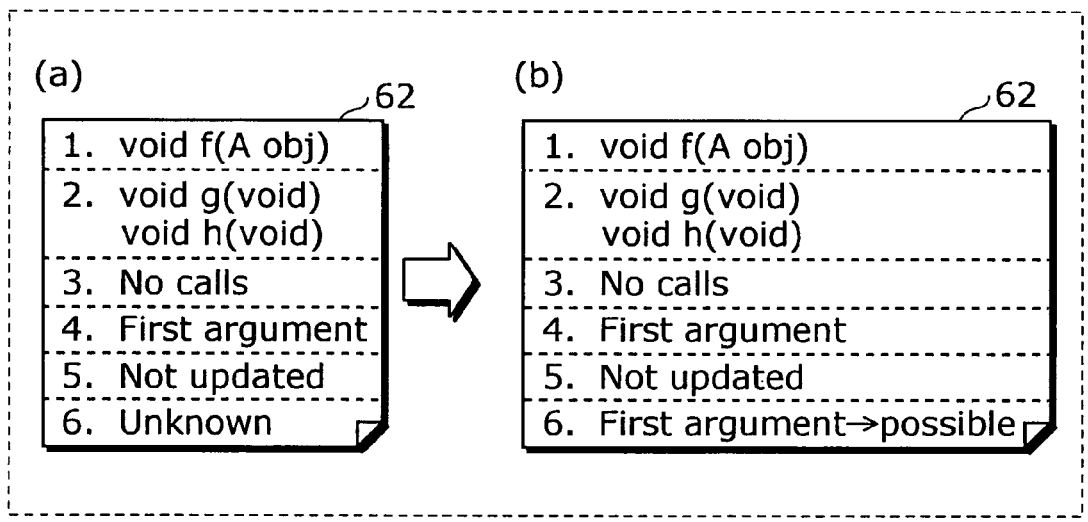
Figure 22:
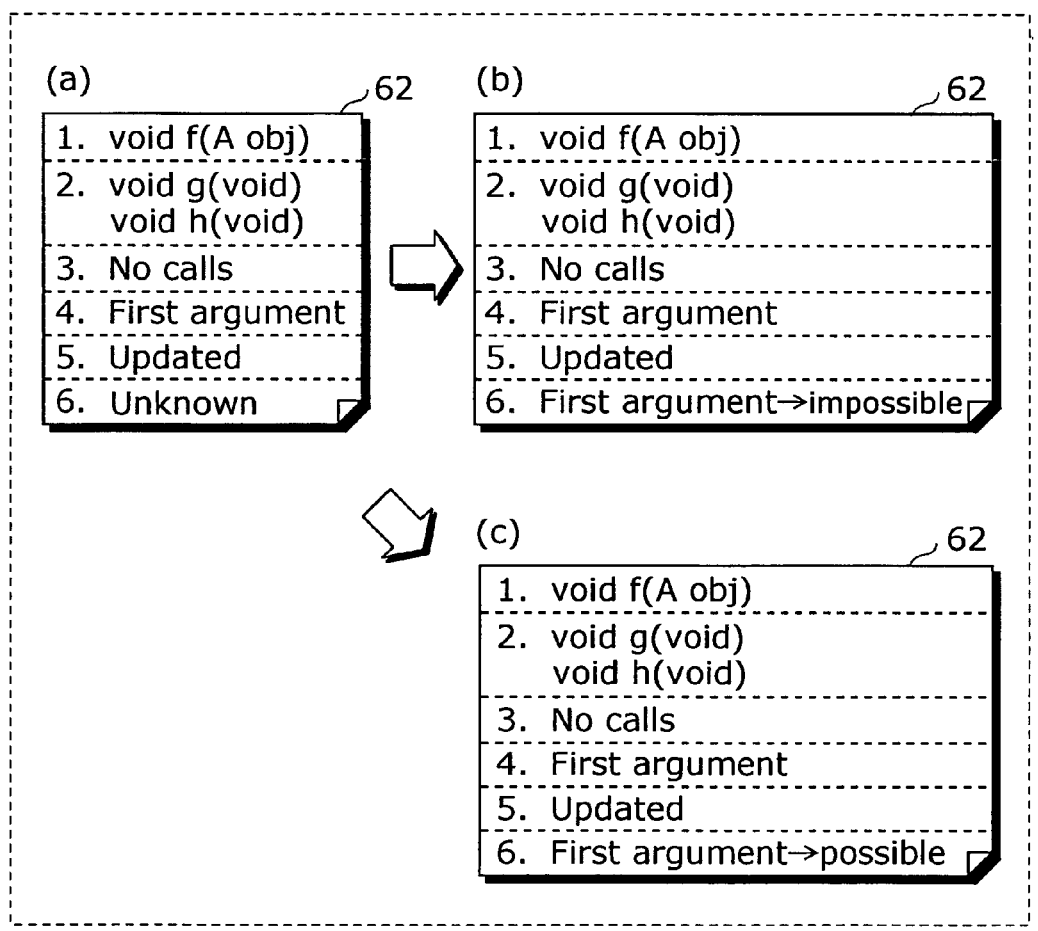

(a) and (b) in FIG. 13 respectively show an example of the pass-by-value argument update information described in the first concrete example;

FIG. 14 shows an example of the stack frame after a pass-by-value argument is converted into a pass-by-reference argument, described in the first and a second concrete examples;

FIG. 15 shows an example of the assembler codes after the argument that is based on "pass by value" is converted into the argument that is based on "pass by reference";

FIG. 16A shows an example of the header file stored in the program storing unit used in the second concrete example;

FIG. 16B shows an example of the source program stored in the program storing unit used in the second concrete example;

FIG. 17 shows an example of the stack frame in the case of passing an argument that is based on "pass by value" in the second concrete example;

FIG. 18 shows an example of the assembler codes in the case of compiling the files shown in FIGS. 16A and 16B using the conventional method;

(a) and (b) in FIG. 19 respectively show an example of the pass-by-value argument update information described in the second concrete example;

FIG. 20A shows an example of the header file stored in the program storing unit used in a third concrete example;

FIG. 20B shows an example of the source program stored in the program storing unit used in the third concrete example;

FIG. 21 shows an example of the assembler codes in the case of compiling the files shown in FIGS. 20A and 20B using the conventional method;

(a), (b) and (c) in FIG. 22 respectively show an example of the pass-by-value argument update information described in the third concrete example;

FIG. 23 shows an example of the stack frame when a pass-by-value argument is forcedly converted into a pass-by-reference argument, in the case where the pass-by-value argument is updated within the definition;

FIG. 24 shows an example of the assembler codes when the pass-by-value argument is forcedly converted into a pass-by-reference argument, in the case where the pass-by-value argument is updated within the definition.

DESCRIPTION OF THE PREFERRED EMBODIMENT(S)

The following describes the compiler according to the embodiment of the present invention, with reference to the diagrams.

Figure 1:
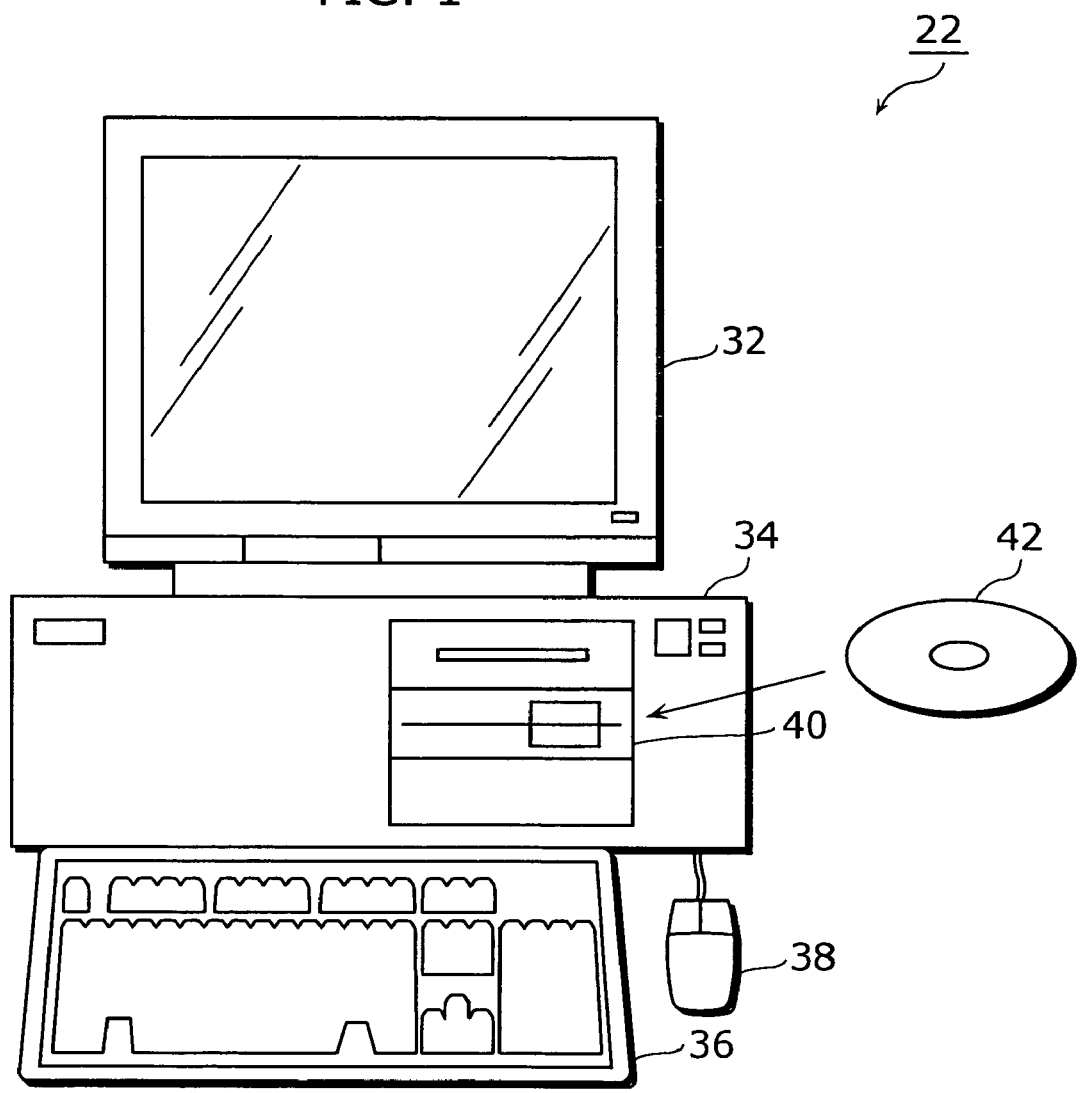
FIG. 1 is an external view of the compiler apparatus that executes a compiler according to the embodiment of the present invention.

FIG. 1 is an external view of the compiler apparatus that executes a compiler. A compiler apparatus 22 is comprised of a computer 34, a monitor 32, a keyboard 36, a mouse 38 and a CD-ROM player 40.

The computer 34 is a processing apparatus for executing a program such as a compiler. The keyboard 36 and the mouse 38 are input apparatuses for inputting instructions to the computer 34, and are respectively connected to the computer 34. The CD-ROM player 40 is an apparatus for reading a program such as the compiler stored in a CD-ROM 42.

Figure 2:
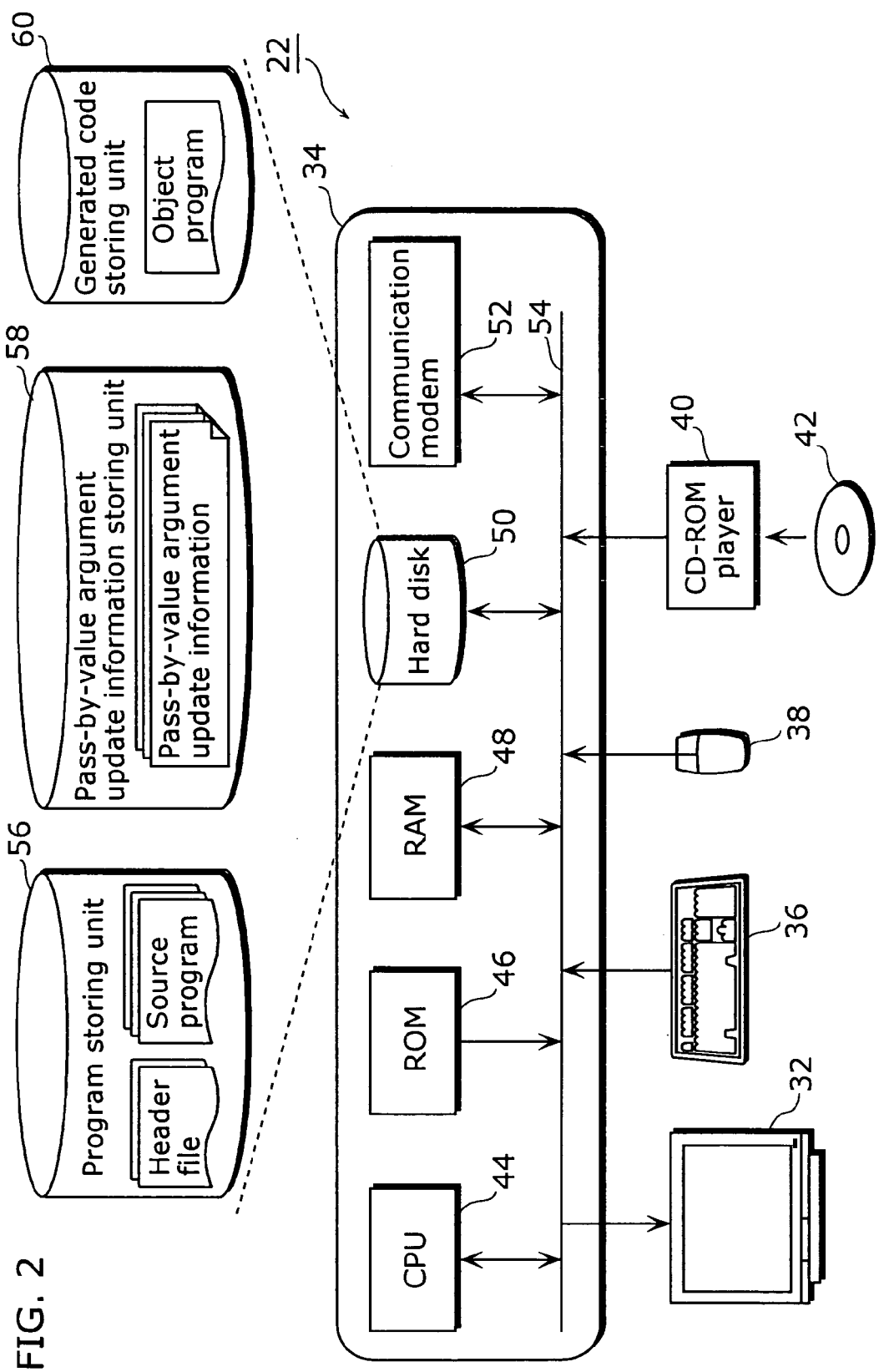
FIG. 2 is a block diagram showing a hardware configuration of the compiler apparatus shown in FIG. 1.

FIG. 2 is a block diagram showing the hardware configuration of the compiler apparatus 22. The computer 34 composing the compiler apparatus 22 includes a Central Processing Unit (CPU) 44, a Read-Only Memory (ROM) 46, a Random Access Memory (RAM) 48, a hard disk 50, a communication modem 52, and a bus 54.

The CPU 44 is a processing unit for executing various kinds of programs such as a compiler. The ROM 46 is a storing unit for storing various kinds of programs and data. The RAM 48 is a storing unit for temporarily storing the programs executed by the CPU 44 and the data generated at the time of executing the programs. The hard disk 50 is a storing apparatus for storing various kinds of programs and data, and includes a program storing unit 56 for storing a header file and a source program, a pass-by-value argument update information storing unit 58 for storing pass-by-value argument update information that is to be mentioned later, and a generation code storing unit 60 for storing an object program. The communication modem 52 is an apparatus for downloading a program via a network such as the Internet. The bus 54 being signal lines for connecting each processing units in the computer 34.

Figure 3:
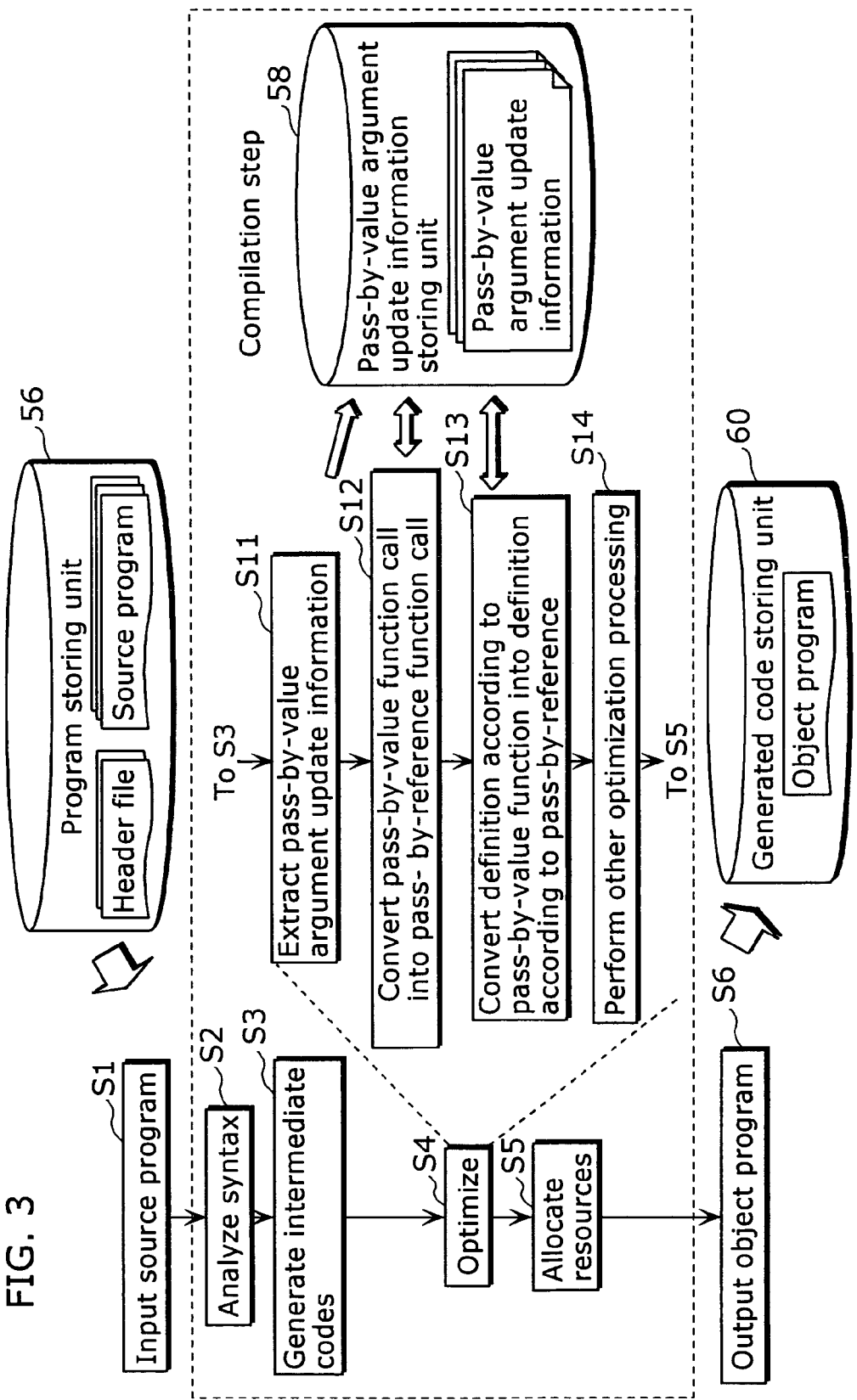
FIG. 3 is a flowchart showing the processing executed by the compiler according to the embodiment of the present invention.

FIG. 3 is a flowchart showing the processing executed by a compiler.

The compiler reads the header file and the source program which are stored in the program storing unit 56 (S1). The compiler then analyzes syntax of the read-out source program and generates a symbol table or a syntax tree (S2). Then, the compiler generates intermediate codes based on the generated syntax tree (S3). After that, the compiler performs various optimizations on the generated intermediate codes (S4). The compiler also allocates hardware resources such as a register and a memory, for all the variables included in the optimized intermediate codes (S5), converts, into object codes, the intermediate codes for which resources are allocated, and outputs an object program to the generated code storing unit 60 (S6).

The optimization processing (S4) includes the following processing: extracting pass-by-value argument update information (S11); converting a pass-by-value function call into a pass-by-reference function call (S12); converting the definition according to the pass-by-value function into the definition according to the pass-by-reference function (S13); and other optimization processing (S14).

In the pass-by-value argument update information extraction processing (S11), "function with pass-by-value argument", "function that directly calls the function with pass-by-value argument", "function that may indirectly call the function with pass-by-value argument", "pass-by-value argument", and "update judgment information" indicating whether or not the pass-by-value argument is updated within a function definition, are extracted based on the intermediate codes.

In the pass-by-value-to-pass-by-reference function call conversion processing (S12), whether or not a pass-by-value function call can be converted into a pass-by-reference function call is judged based on the information extracted in the pass-by-value argument update information extraction processing (S11). In the processing (S12), a pass-by-value function call is converted into a pass-by-reference function call, based on the result of the judgment as well.

In the pass-by-value-to-pass-by-reference function definition conversion processing (S13), whether the argument passing that is based on a value of the pass-by-reference function can be converted into the argument passing that is based on a value of the pass-by-reference function is judged based on the information extracted in the pass-by-value argument update information extraction processing (S11). In the processing (S13), the argument passing that uses the value of the pass-by-value function is converted into the argument passing that uses the value of the pass-by-reference, based on the result of the judgment.

The detail of the processing S11, S12, and S13 will be mentioned later.

It should be noted that the pass-by-value-to-pass-by-reference function call conversion processing (S12) and the pass-by-value-to-pass-by-reference function definition conversion processing (S13) may be executed in reverse order.

The other optimization processing (S14) is the processing which is performed as a general processing and is not included in the subject of the present invention, therefore, the description is omitted.

Figure 4:
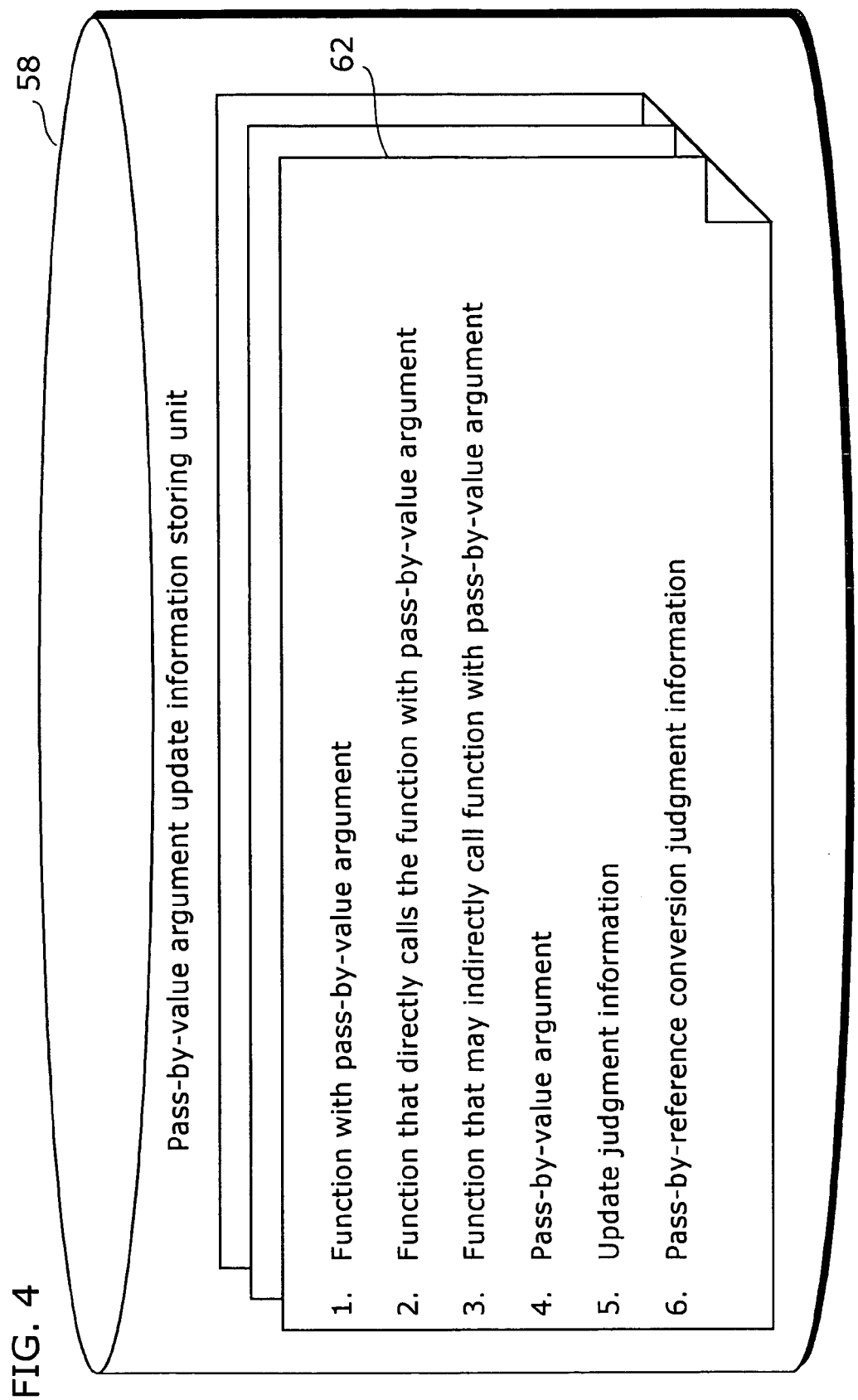
FIG. 4 is a diagram for explaining the contents of the pass-by-value argument update information that is stored in a pass-by-value argument update information storing unit.

FIG. 4 is a diagram for explaining the contents of the pass-by-value argument update information 62 stored in the pass-by-value argument update information storing unit 58. The pass-by-value argument update information 62 includes "function with pass-by-value argument", "function that directly calls the function with pass-by-value argument", "function that may indirectly call the function with pass-by-value argument", "pass-by-value argument", "update judgment information" and "pass-by-reference conversion judgment information". The detail will be explained, as required, in the description of the processing which will be mentioned later.

It should be noted that the processing such as source program input (S1), syntax analysis (52), intermediate code generation (S3), other optimization (S14), resource allocation (S5) and object output (S6) are as same as the conventional one, and is not the subject of the present invention. The detailed description is therefore omitted.

The following sequentially explains the pass-by-value argument update information extraction processing (S11), the pass-by-value-to-pass-by-reference function call conversion processing (S12) and the pass-by-value-to-pass-by-reference function definition conversion processing (S13) which are the subjects of the present invention.

Figure 5:
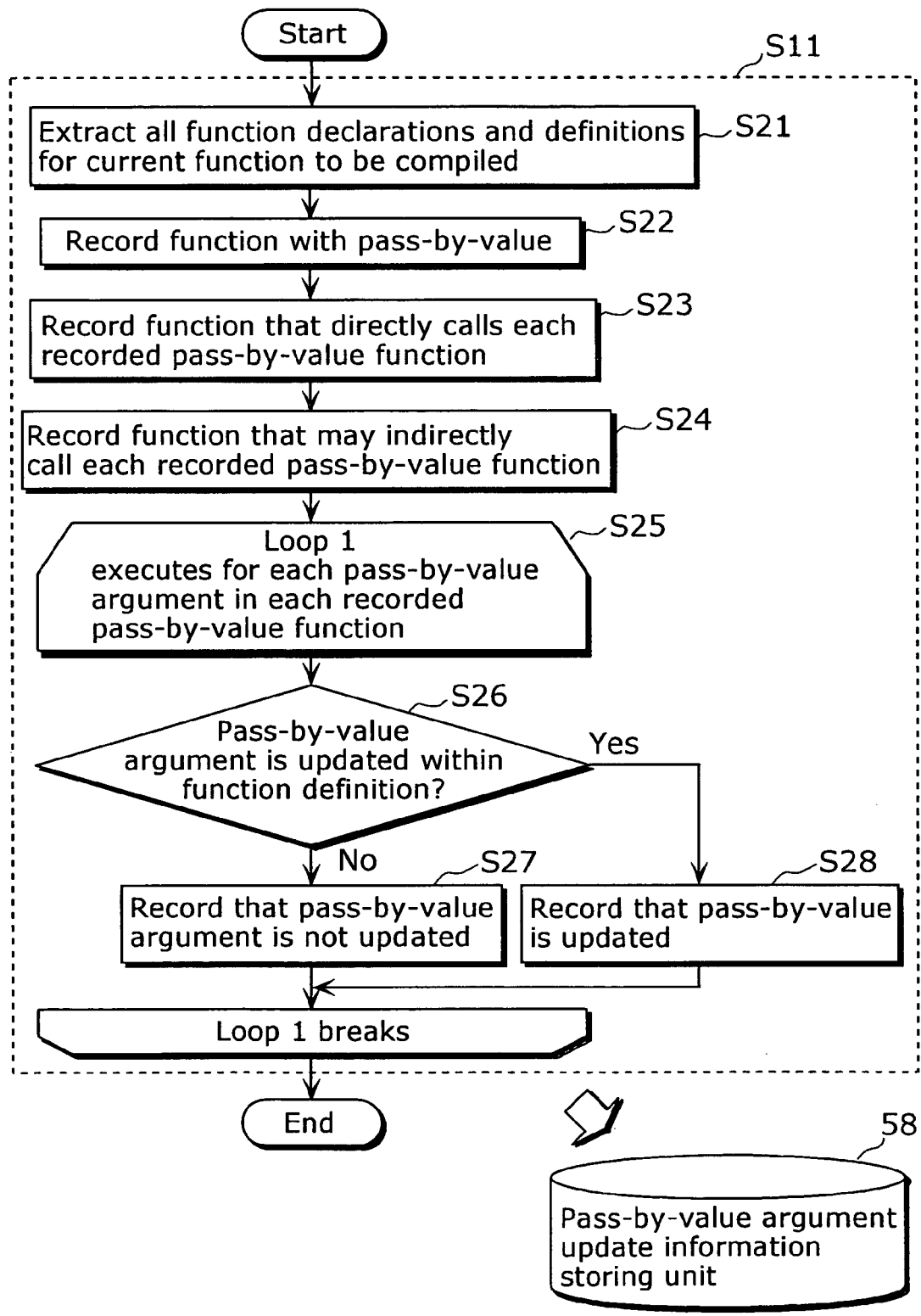
FIG. 5 is a flowchart showing in detail the processing of extracting the pass-by-value argument update information.

FIG. 5 is a flowchart showing in detail the pass-by-value argument update information extraction processing (S11).

The compiler extracts all the function declarations and definitions from the current intermediate codes to be compiled (S21). The objects to be compiled in this case may be a compilation either for a single translation unit (i.e., a single source program) or for plural translation units (i.e., plural source programs).

The compiler extracts "function with pass-by-value argument" from the extracted function declarations and definitions, and records it into the pass-by-value argument update information 62 (S22). Then, the compiler extracts a function that directly calls (call is performed with use of names of functions, and the function which is called in the compilation processing is uniquely determined) each of the pass-by-value functions stored in the pass-by-value argument update information 62, and records it in the pass-by-value argument update information 62 (S23). Similarly, the compiler indirectly calls (call is performed with use of pointers to the function, and the function which is called in the compilation processing is not uniquely determined) each of the pass-by-value functions recorded in the pass-by-value argument update information, and records it in the pass-by-value argument update information 62 (S24).

Figure 7A:
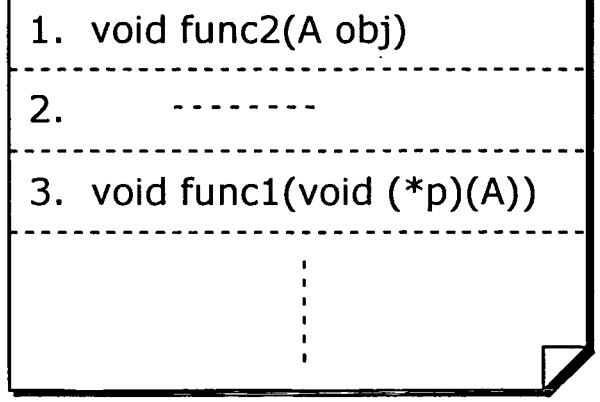
FIGS. 7A to 7C respectively show an example of the pass-by-value argument update information for the source program that includes the function that may indirectly call a pass-by-value function.
Figure 7B:
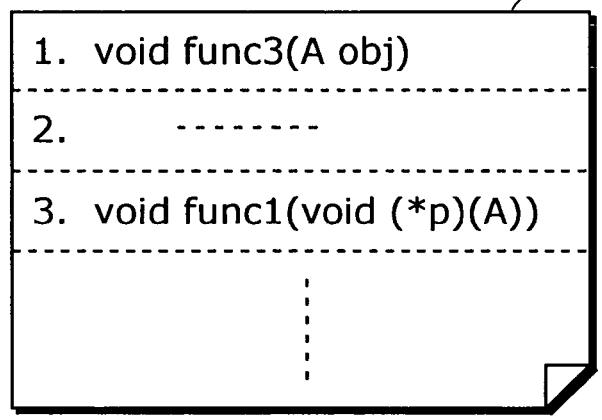
Figure 7C:
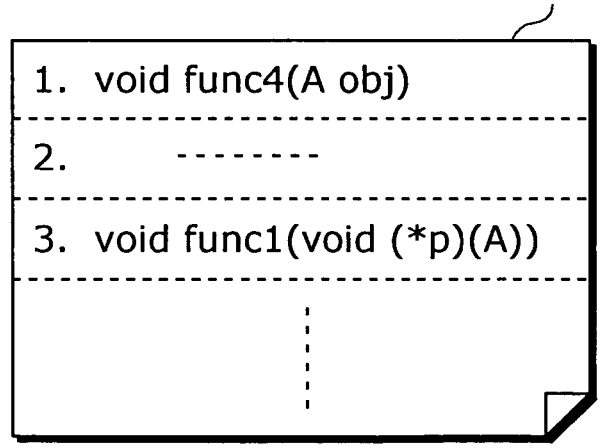

FIG. 6 shows an example of the source program that includes the function that may indirectly call a pass-by-value function. A function call p(x) for the function with pass-by-value argument that is based on a structure A exists in the definition according to the function "func1". It is not possible, in the function call p(x), to identify the function that is actually called from among "func2" "func3" and "func4", each having the pass-by-value argument that is based on the structure A. Therefore, as shown in FIGS. 7A-7C, the "func1" is recorded as a function that may indirectly call a pass-by-value function in each pass-by-value argument update information 62 for the respective "func2", "func3" and "func4".

Then, the compiler performs the following processing for each pass-by-value argument of each of the recorded pass-by-value functions (S25). The compiler judges whether or not the pass-by-value argument is possibly updated within the function definition (S26). In the case where there is no such possibility (No in S26), the compiler records the update judgment information indicating "pass-by-value argument is not updated" into the pass-by-value argument update information 62 (S27). In the case where there is such possibility (Yes in S26), the compiler records the update judgment information indicating "pass-by-value is updated" in the pass-by-value argument update information 62 (S28).

By performing the above processing, "function with pass-by-value argument", "function that directly calls the function with pass-by-value argument", "function that may indirectly call the function with pass-by-value argument", "pass-by-value argument", "update judgment information" are extracted from the pass-by-value argument update information 62 with respect to the current object to be compiled.

Figure 8:
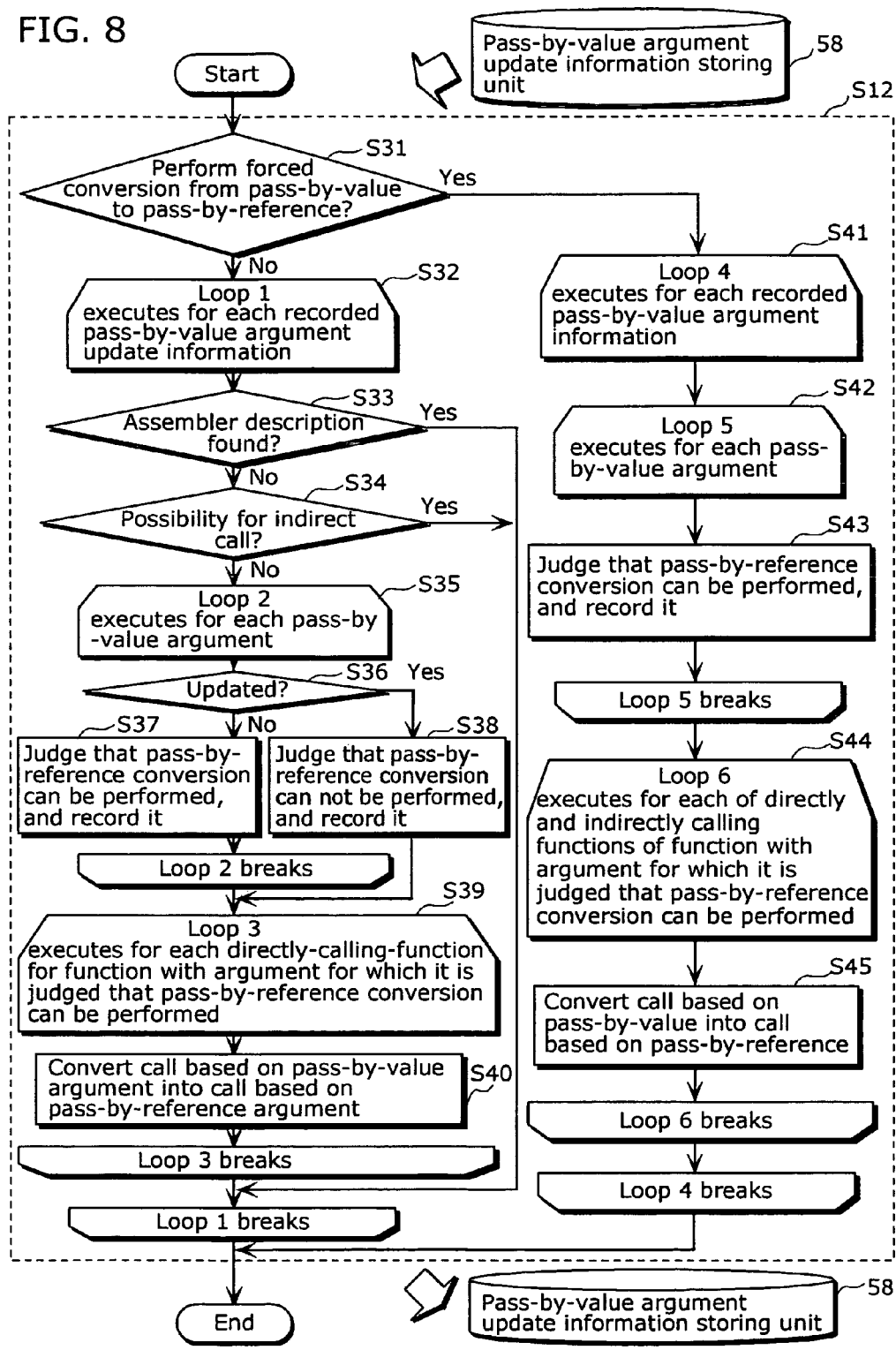
FIG. 8 is a flowchart showing in detail the processing of converting a pass-by-value function call into a pass-by-reference function call.

Next, the pass-by-value-to-pass-by-reference function call conversion processing (S12) will be explained in detail with reference to the flowchart shown in FIG. 8.

The compiler firstly judges whether or not to perform forced conversion from a pass-by-value function to a pass-by-reference function (S31). Here, the judgment is based on the user's instructions related to command line options and (a) pragma(s) or a result of evaluating optimization that is separately performed in the compiler (profile information after an object program is simulated). In the case where a reduction in code size is desired, a pass-by-value function is forcedly converted into a pass-by-reference function.

In the case where the forced conversion is not performed (No in S31), the compiler repeats the following loop processing for each of the registered pass-by-value argument update information 62 (S32). The compiler examines, based on an assembler description such as an asm statement, whether or not "function that directly calls the function with pass-by-value argument" and "function that may call the function with pass-by-value argument", which are included in the current pass-by-value argument update information 62, are converted into the call that uses "pass by reference" (S33). In the case where the conversion into the call that uses "pass by reference" is performed (Yes in S33), the compiler repeats the loop processing (S32) for the next pass-by-value argument update information 62.

In the case where the conversion into the call that uses "pass by reference" is not performed based on the assembler description (No in S33), the compiler judges whether or not the current "function with pass-by-value argument" is possibly called (S34). That is to say that the compiler examines whether or not the name of the function is described under the title "function that may indirectly call the function with pass-by-value argument" in the pass-by-value argument update information 62 (S34).

In the case where there is a "function that may indirectly call the function with pass-by-value argument" (Yes in S34), the current "function with pass-by-value argument" is not targeted for pass-by-reference conversion. Therefore, the compiler newly processes the next pass-by-value argument update information 62.

In the case where there is no "function that may indirectly call the function with pass-by-value argument" (No in S34), the compiler executes loop processing (S35) for each "pass-by-value argument". In the loop processing (S35), the compiler judges whether or not the pass-by-value argument is updated (S36). In the case where the pass-by-value argument is updated (Yes in S36), the compiler judges that the pass-by-reference conversion cannot be performed, and records the result of the judgment in the "pass-by-reference conversion judgment information" in the pass-by-value argument update information 62 (S38). In the case where the pass-by-value argument is not updated (No in S36), the compiler judges that the pass-by-reference conversion can be performed, and records the result in the "pass-by-reference conversion judgment information" in the pass-by-value argument update information 62 (S37).

Then, the compiler executes loop processing (S39) for each directly-calling-function, for functions with argument for which it is judged that the pass-by-reference conversion can be performed. In the loop processing (S39), a call that uses pass-by-value argument is converted into a call that uses pass-by-reference argument (S40).

In the case where forced pass-by-reference conversion is performed (Yes in S31), the information indicating that pass-by-reference conversion can be performed is recorded in the "pass-by-reference conversion judgment information" for all the pass-by-value arguments in the recorded pass-by-value argument update information 62, and a call that uses pass-by-value argument is converted into a call that uses pass-by-reference argument (S41, S42, S43, S44 and S45).

With the above processing, the call that uses pass-by-value argument that is a candidate for conversion can be converted into the call that uses pass-by-reference argument.

Figure 9:
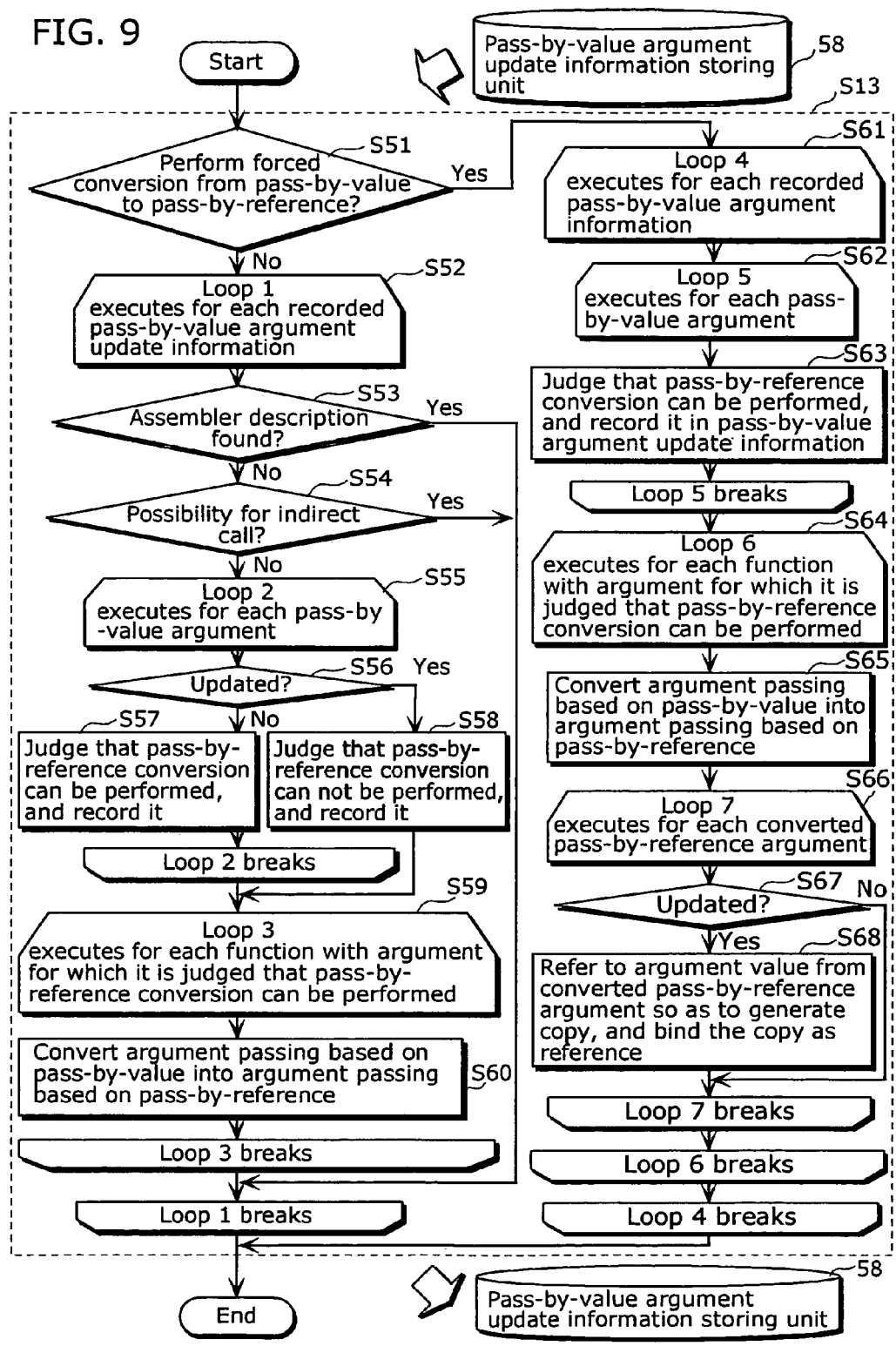
FIG. 9 is a flowchart showing in detail the processing of converting a definition according to a pass-by-value function into a definition according to a pass-by-reference function.

Next, the pass-by-value-to-pass-by-reference function definition conversion processing (S13) will be explained in detail with reference to the flowchart shown in FIG. 9. The processing of obtaining "pass-by-reference conversion judgment information" stored in the pass-by-value argument update information 62 (S51-S58 and S61-S63) is as same as the processing shown in FIG. 8 (S31-S38 and S41-S43). The description is therefore omitted. They are processing for recording, into the pass-by-value argument update information 62, whether or not a call that uses pass-by-value argument can be converted into a call that uses pass-by-reference argument. The processing of S51-S58 and S61-S63 and the processing of S31-S38 and S41-S43 being the same, it does not matter which of the pass-by-value-to-pass-by-reference function call conversion processing (S12) and the pass-by-value into pass-by-reference function definition conversion processing (S13) is executed first in the optimization processing (S4) executed by the compiler. Therefore, in the case where either of the processing S12 or S13 is already executed and "pass-by-reference conversion judgment information" in the pass-by-value argument update information 62 is already recorded, the processing of judging whether or not the pass-by-reference conversion can be performed as well as the processing of recording the result of the judgment may be omitted.

In the case where the pass-by-reference conversion is not forcedly performed (No in S51), the loop processing (S59) is executed for the function having the argument for which it is judged that the pass-by-reference conversion can be performed, after the result of the judgment is recorded in the "pass-by-reference conversion judgment information" in the pass-by-value argument update information 62. In the loop processing (S59), an argument passing that uses pass-by-value argument is converted into an argument passing that uses pass-by-reference argument (S60).

In the case where forced conversion is performed (Yes in S51) and after the result of the judgment is recorded in the "pass-by-reference conversion judgment information" in the pass-by-value argument update information 62, loop processing (S64) is executed for the function having the argument for which it is judged that the pass-by-reference conversion can be performed. In the loop processing (S64), the argument passing that uses pass-by-value is converted into the argument passing that uses pass-by-reference (S65). Then, the loop processing (S66) is performed for the converted pass-by-reference argument. In the loop processing (S66), the result of the judgment on whether or not the pass-by-value argument is updated within the function definition is examined based on the "update judgment information" (S67). In the case where the pass-by-value argument is updated (Yes in S67), an argument value is referred to from the converted pass-by-reference so as to generate a copy of it, and sets again the copy as a reference (S68). This processing is carried out in order to prevent the result of update, which is resulted from the conversion of the argument passing that uses pass-by-value into the argument passing that uses pass-by-reference, from being reflected on the side of the caller. This is because the update of argument performed by the function callee should not be reflected on the side of the function caller since the processing originally relates to the argument passing that uses pass-by-value. That is to say, in the case where the argument is updated, the copy of the argument that is conventionally generated by the function caller is generated by the function callee.

Thus, when a temporary variable is generated on the side of the caller, the temporary variable has to be generated each time a function is called, however, when a temporary variable is generated on the side of the callee, the codes for generating temporary variables can be put together in one place. Therefore, code size can be reduced.

By performing the above processing, the argument passing that uses pass-by-value argument, which is a candidate for conversion, can be converted into the argument passing that uses pass-by-reference argument.

By executing the processing of resource allocation (S5) and object program output (S6) for the intermediate codes on which the optimization processing (S4), including the pass-by-value argument update information extraction processing (S11), the pass-by-value-to-pass-by-reference function call conversion processing (S12), the pass-by-value-to-pass-by-reference function definition conversion processing (S13) and other optimization processing (S14), is performed, the size of the object codes in the object program that is eventually generated is reduced.

The following describes the optimization processing of converting a function that uses pass-by-value argument into a function that uses pass-by-reference argument.

(First Concrete Example)

FIG. 10A shows an example of the header file stored in the program storing unit 56 while FIG. 10B shows an example of the source program stored in the program storing unit 56. The following describes the operation of the compiler after the header file and the source program are inputted.

In the header file "struct.h" shown in FIG. 10A, a definition according to the structure A is described, whereas in the source program "prog1.cc" shown in FIG. 10B, processing of reading the header file "struct.h", a definition according to a pass-by-value argument function "void f(A obj)", and definitions according to the functions that call the function f, "void g(void)" and "void h(void)" are described.

The concrete example of the conventional method is firstly shown. The function f is a "function with pass-by-value argument". Therefore, when the function f is called using the function g or h, an argument passing is performed using "pass by value".

Figure 11:
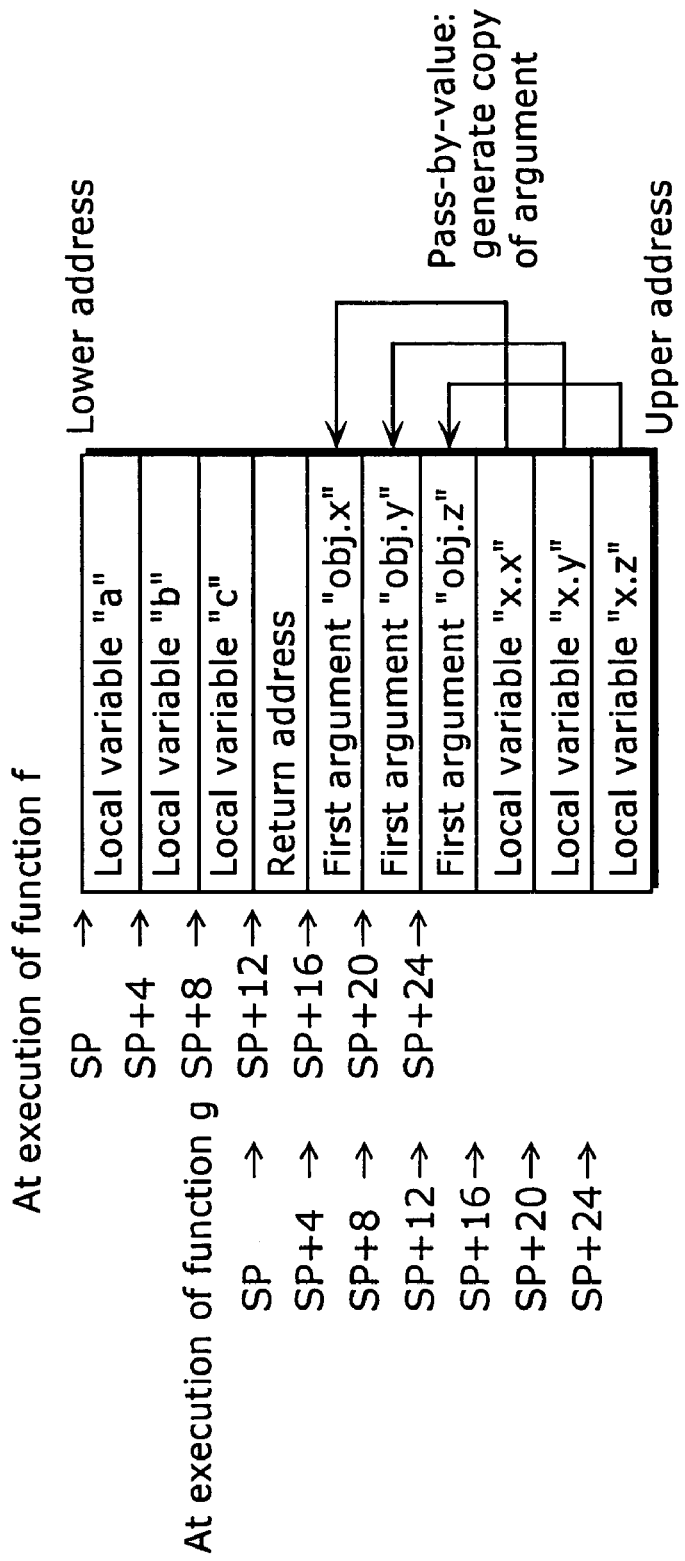
FIG. 11 shows an example of the stack frame in the case of passing an argument in the first concrete example.

FIG. 11 shows an example of the stack frame in the case where the function f is called using the function g. In the definition according to the function g shown in FIG. 10B, the function f is called using a local argument x as a pass-by-value argument. As shown in FIG. 11, the structure of the stack frame in this case is that the copy of the argument value in the areas allocated for local arguments (SP (a value of stack point)+16 to SP+24 at the time of executing the function g) is stored into the areas allocated for actual arguments (SP+4 to SP+12 at the time of executing the function f). When the execution is shifted to the function f, an access to the argument can be realized by accessing the areas allocated for dummy functions (SP+16 to SP+24 at the time of executing the function f).

FIG. 12 shows assembler codes indicating the definition according to the functions f and g, in the case where the conventional method is employed. As shown in the definition according to the function f, the values of dummy arguments "obj.x", "obj.y", and "obj.z" are respectively read from the stack frames "SP+16", "SP+20" "SP+24". As shown in the definition according to the function g, the values are copied from the areas f or local variables (SP+16 to SP+24) to the areas for actual arguments (SP+4 to SP+12).

Next, the concrete example is presented. After the execution of the pass-by-value argument update information extraction processing (S11), the pass-by-value argument update information 62 as shown in (a) in FIG. 13 is extracted. Namely, the following information is extracted: "void f(A obj)" as "function with pass-by-value argument"; "void g(void)" and "void h(void)" as "function that directly calls the function with pass-by-value argument"; there is no "function that may indirectly call the function with pass-by-value argument"; "pass-by-value argument" targeted for pass-by-value in the function f is a first argument "A obj"; and the argument is not updated within the function definition.

Next, after the execution of the pass-by-value-to pass-by-reference function call conversion processing (S12), "possible" is recorded in the "pass-by-reference conversion judgment information" of the first argument, as shown in (b) in FIG. 13, irrespective of the result of the judgment processing (S31) on whether or not to perform forced pass-by-reference conversion. This is because the pass-by-value argument "A obj" of the function f is not updated although it is used for reference within the function definition. In this way, a pass-by-value function call is converted into a pass-by-reference function call.

Similarly, in the case of performing the pass-by-value-to-pass-by-reference function definition conversion processing (S13), it is recorded that the pass-by-reference conversion can be performed irrespective of the result of the judgment (S51) on whether or not to perform forced pass-by-reference conversion. The argument passing that uses "pass by value" is converted into the argument passing that uses "pass by reference", for the function f.

FIG. 14 shows an example of the stack frame in the case where a pass-by-value argument is converted into a pass-by-reference argument. In the area for actual arguments (SP+4 at the time of executing the function g), an argument value is changed into a reference to an argument (i.e. address). This shows that the area available for stack is reduced.

FIG. 15 shows the assembler codes indicating the definitions according to the functions f and g, in the case where a pass-by-value argument is converted into a pass-by-reference argument. As shown in the definition according to the function f, it is shown that the dummy function is accessed via the argument address stored in the area for dummy arguments (SP+16 at the time of executing the function f) since a dummy argument is regarded as a reference to the argument value (i.e., address), but not an argument value per se. As shown in the definition according to the function g, the starting address of the local variable object (an address value of SP+8 at the time of executing the function g) is set as the area for actual arguments (SP+4 at the time of executing the function g). Thus, the method of argument passing that uses pass-by-value argument is converted into the one that uses pass-by-reference argument so that there is no need to copy the argument value as is the case of the conventional method shown in the concrete example in FIG. 12. Therefore, code size is successfully reduced.

(Second Concrete Example)

FIG. 16A shows an example of the header file stored in the program storing unit 56 while FIG. 16B shows an example of the source program stored in the program storing unit 56. The following describes the operation of the compiler after the header file and the source program are inputted.

In the header file "class.h" shown in FIG. 16A, a definition according to a class A is described. The class A defines member variables x, y and z, a default constructor A(void), a copy constructor A(A &obj) as well as member functions "get_x", "get_y", "get_z", "set_x", "set_y" and "set_z". In the source program "prog2.cc" shown in FIG. 16B, processing of reading the header file "class.h", a definition according to the pass-by-value argument function "void f(A obj)", definitions according to functions that call the function f, "void g(void)" and "void h(void)", are described.

The concrete example of the conventional method is firstly presented. As in the case of the first concrete example, the function f is a "function with pass-by-value argument" so that when the function f is called using the function g or f, the method of passing an argument is based on pass-by-value. FIG. 17 shows an example of the stack frame in the case where the function f is called using the function g. In the definition according to the function g shown in FIG. 10B, the function f is called using a local argument x as a pass-by-value argument. For the local argument x, a copy constructor ("A(A &obj)" of "class.h") is defined in the class A, therefore, in the case where the argument passing is performed based on "pass by value", temporary variables (temp.x, temp.y and temp.z) are implicitly generated by calling copy constructor. The structure of the stack frame in this case is as shown in FIG. 17. Namely, the values generated by calling the copy constructor in the areas allocated for local variables (SP+28 to SP+36 at the time of executing the function g) are stored in the areas allocated for temporary variables (SP+4 to SP+12 at the time of executing the function g). After that, the copies of the temporary variables (i.e. argument values) are to be stored into the areas allocated for actual arguments (SP+4 to SP+12 at the time of executing the function g). When the execution shifts to the function f, the arguments can be accessed by accessing the areas allocated for dummy arguments (SP+16 to SP+24 at the time of executing the function f).

FIG. 18 shows the assembler codes representing the definitions according to the functions f and g, in the case where the conventional method is employed. As shown in the definition according to the function f, the dummy arguments "obj.x", "obj.y" and "obj.z" are respectively read from SP+16, SP+20 and SP+24 of the stack frame. As shown in the definition according to the function g, it is apparent that the copy constructor is called before calling the function f, and it is after the storage of the values generated by calling the copy constructor into the temporary variable areas that the values are copied from the areas for temporary variables (SP+16 to SP+24) to the areas for actual arguments (SP+4 to SP+12).

The following describes the concrete example of the embodiment. After the execution of the pass-by-value argument update information extraction processing (S11), the pass-by-value argument update information 62 as shown in (a) in FIG. 19 is extracted. Namely, the following information is extracted: "void f(A obj)" as "function with pass-by-value argument"; "void g(void)" and "void h(void)" as "function that directly calls the function with pass-by-value argument"; there is no "function that may indirectly call the function with pass-by-value argument"; "pass-by-value argument" targeted for pass-by-value in the function f is a first argument "A obj"; and the argument is not updated within the function definition.

Next, after the execution of the pass-by-value-to-pass-by-reference function call conversion processing (S12), "possible" is recorded in the "pass-by-reference conversion judgment information" of the first argument, as shown in (b) in FIG. 19, irrespective of the result of the judgment processing (S31) on whether or not to perform the forced pass-by-reference conversion. This is because the pass-by-value argument "A obj" of the function f is not updated although it is used for reference within the function definition. In this way, a pass-by-value function call is converted into a pass-by-reference function call.

Similarly, in the case of performing the pass-by-value-to-pass-by-reference function definition conversion processing (S13), it is recorded that the pass-by-reference conversion can be performed, irrespective of the result of the judgment (S51) on whether or not to perform forced pass-by-reference conversion. The argument passing that uses "pass by value" is converted into the argument passing that uses "pass by reference", for the function f.

As is the case of the first concrete example, the stack frame is generated as shown in FIG. 14 since the argument passing that uses "pass by value" is converted into the argument passing that uses "pass by reference".

The class A shown in the example of the program in FIGS. 16A and 16B has the same data structure as the structure A shown in FIG. 10A. The pass-by-value argument update information 62 shown in (b) in FIG. 19 is as same as the one shown in (b) in FIG. 13 so that the assembler codes representing the definitions according to the functions f and g are as shown in FIG. 15, as in the case of the first concrete example. Thus, the method of passing an argument based on "pass by value" is converted into the one based on "pass by reference". Therefore, there is no need to generate the argument values copied by the copy constructor and store the copied values into the areas for actual arguments. This shows that the code size is successfully reduced.

(Third Concrete Example)

FIG. 20A shows an example of the header file stored in the program storing unit 56 while FIG. 20B shows an example of the source program stored in the program storing unit 56. The following describes the operation of the compiler after the header file and the source program are inputted.

The header file "struct.h" shown in FIG. 20A is the same as the header file "struct.h" shown in FIG. 10A. The source program "prog3. cc" shown in FIG. 20B is almost the same as the source program "prog1. cc" shown in FIG. 10B. The difference, however, is that according to the former source program, each argument "obj" is updated ("obj.x=b;", "obj.y=c;" and "obj.z=a;") in the definition according to the function f. The example of the stack frame in this case is as same as the one shown in FIG. 11. FIG. 21 shows the assembler codes representing the definitions according to the functions f and g, in the case where the conventional method is employed. The codes are almost the same as those shown in FIG. 12, but the processing of updating the arguments "obj" is added in the definition according to the function f.

The following presents the concrete example. After the execution of the pass-by-value argument update information extraction processing (S11), the pass-by-value argument update information 62 as shown in (a) in FIG. 22 is extracted. Namely, the following information is extracted: "void f(A obj)" as "function with pass-by-value argument"; "void g(void)" and "void h(void)" as "function that directly calls the function with pass-by-value argument"; there is no "function that may indirectly call the function with pass-by-value argument"; "pass-by-value argument" targeted for pass-by-value in the function f is a first argument "A obj"; and the argument is updated within the function definition.

Next, after the execution of the pass-by-value-to-pass-by-reference function call conversion processing (S12), in the case where it is judged that the forced conversion should not be performed as a result of the judgment on the forced pass-by-reference conversion (S31) since the pass-by-value argument "A obj" of the function f is updated within the function definition, "impossible" is recorded in the "pass-by-reference conversion judgment information" of the first argument as shown in (c) in FIG. 22, and a pass-by-value function call is converted into a pass-by-reference function call.

Similarly, in the case of performing the pass-by-value-to-pass-by-reference function definition conversion processing (S13), in the case where it is judged that the forced pass-by-reference conversion should not be performed (No in S51), "impossible" is recorded in the "pass-by-reference conversion judgment information", and the conversion is not performed. In the case where it is judged that the forced conversion should be performed (Yes in S51), it is recorded that the conversion is "possible", and the argument passing that uses "pass by value" is converted into the argument passing that uses "pass by reference", for the function f. In addition, the processing of S68 in FIG. 9 is executed due to the presence of the update of the pass-by-value argument, the argument value is referred to from the converted pass-by-reference argument so as to generate a copy of the argument value that is before the update processing is performed, and the copy is set as a reference.

FIG. 23 shows an example of the stack frame in the case where a forced pass-by-reference conversion is performed. In the concrete example of the conventional method, the copy of the argument value is generated by the caller, therefore, the copy is allocated for the caller (i.e., an access area of the function g), as shown in FIG. 17. In the present invention, the copy is allocated for the callee (i.e. an access area of the function f) due to the generation of the copy of the argument value performed by the callee, as shown in FIG. 23.

FIG. 24 shows the assembler codes representing the definitions according to the functions f and g in the case where a pass-by-value argument is forcedly converted into a pass-by-reference argument. In FIG. 12 which is the concrete example of the conventional method, a copy of the argument value is generated within the definitions according to the functions f and g so that the argument passing is performed. In the present invention, however, as shown in FIG. 24, the argument passing is performed based on a reference that is an address of the argument value in the functions f and g, and a copy of the argument value is generated within the definition according to the function f so that it is set as an argument value. By thus changing the location so that the argument values to be copied are moved from the caller to the callee, it is possible for the pass-by-value function callee to generate the copy for only one time whereas in the conventional case, the copy of the argument value has to be generated each time the function is called using "pass by value". This shows that the code size is successfully reduced. The more the number of times calling a function increases, the higher the effects are.

As described above, the function that uses pass-by-value argument and the function that calls the function that uses pass-by-value argument are respectively converted into the function that uses a pass-by-reference argument and the function that calls the function that uses a pass-by-reference argument. Therefore, there is no need to copy the argument in the stack frame, which reduces the code size of the object program.

The above has described the compiler according to the present embodiment of the present invention, however, the present invention is not limited to the embodiment described above.

For example, the argument passing with the use of stack frame is taken as an example in the embodiment, but the argument passing may be performed using a register or the like, as the compilation environment requires.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The compilation method according to the present invention is applicable to the compilation method intended for a built-in device that requires object codes with small code size, such as a cell phone and a Personal Digital Assistant (PDA).

What is claimed is:

1. A compilation method for converting a source program written in a high-level language into object codes, comprising:
   generating intermediate codes from the source program;
   optimizing the intermediate codes by converting a pass-by-value argument into a pass-by-reference argument, in the case where both of the following conditions are satisfied: there is no procedure that may indirectly call a procedure with pass-by-value argument; and the pass-by-value argument is not updated within a definition according to the procedure with pass-by-value argument; and
   converting the optimized intermediate codes into object codes, wherein the optimizing further includes:
   extracting pass-by-value argument update information based on the intermediate codes, the information including at least the following: a procedure with pass-by-value argument; a procedure that directly calls the procedure with pass-by-value argument; a procedure that may indirectly call the procedure with pass-by-value argument; a pass-by-value argument of the procedure with pass-by-value argument; and update judgment information indicating whether or not the pass-by-value argument is updated within the definition according to the procedure with pass-by-value argument; and
   converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

2. The compilation method according to claim 1, wherein in the optimizing, in the case where both of the following conditions are satisfied: there is no procedure that may indirectly call a procedure with pass-by-value argument; and the pass-by-value argument is not updated within the definition according to the procedure with pass-by-value argument, the intermediate codes are optimized by converting the procedure that calls a procedure with pass-by-value argument into a procedure that calls a procedure with pass-by-reference argument.

3. The compilation method according to claim 2, further comprising
   optimizing the intermediate codes by converting, for the procedure with pass-by-value argument, an argument passing with the use of pass-by-value into an argument passing with the use of pass-by-reference.

4. The compilation method according to claim 1, wherein in the converting, when it is not specified to forcedly convert the procedure that directly calls a procedure with pass-by-value argument into the procedure that directly calls a procedure with pass-by-reference argument, a procedure with pass-by-value argument is converted into a procedure with pass-by-reference argument, in the case where the pass-by-value argument update information indicates that neither there is a procedure that may indirectly call a procedure with pass-by-value argument nor the pass-by-value argument is updated within the definition according to the procedure with pass-by-value argument.

5. The compilation method according to claim 1, wherein in the converting, when it is specified to forcedly convert a procedure that directly calls a procedure with pass-by-value argument into a procedure that directly calls a procedure with pass-by-reference argument, the following conversions are performed as specified for the procedure that directly calls a procedure with pass-by-value argument, based on the pass-by-value argument update information: the procedure that directly calls a procedure with pass-by-value argument is converted into the procedure that directly calls a procedure with pass-by-reference argument; and the procedure that may indirectly call a procedure with pass-by-value argument is converted into the procedure that may indirectly call a procedure with pass-by-reference argument.

6. The compilation method according to claim 1, wherein in the optimizing, in the case where both of the following conditions are satisfied: there is no procedure that may indirectly call a procedure with pass-by-value argument; and the pass-by-value argument is not updated within the definition according to the procedure with pass-by-value argument, the intermediate codes are optimized by converting an argument passing with the use of pass-by-value into an argument passing with the use of pass-by-reference.

7. The compilation method according to claim 6, wherein the optimizing further includes:

extracting pass-by-value argument update information based on the intermediate codes, the information at least including: a procedure with pass-by-value argument; a procedure that directly calls the procedure with pass-by-value argument; a pass-by-value argument of the procedure with pass-by-value argument; and update judgment information indicating whether or not the pass-by-value argument is updated within the definition according to the procedure with pass-by-value argument; and converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

8. The compilation method according to claim 7, wherein in the converting, when it is not specified to forcedly convert, for the procedure with pass-by-value argument, an argument passing with the use of pass-by-value into an argument passing with the use of pass-by-reference, an argument passing with the use of pass-by-value is converted into an argument passing with the use of pass-by-reference, in the case where the pass-by-value argument update information indicates that there is no procedure that may indirectly call a procedure with pass-by-value argument, and the pass-by-value argument is not updated within the definition according to the procedure with pass-by-value argument.

9. The compilation method according to claim 7, wherein in the converting, when it is specified to forcedly convert, for the procedure with pass-by-value argument, an argument passing with the use of pass-by-value into an argument passing with the use of pass-by-reference argument, an argument passing with the use of pass-by-value is converted into an argument passing with the use of pass-by-reference, as specified for the procedure with pass-by-value argument, and in the case where the pass-by-value argument is updated within the procedure definition, an argument value is referred to from the converted pass-by-reference argument so as to generate a copy of the argument value, in the intermediate codes, at a location before a part where a value is actually updated, and the location where the copy is generated is set as a reference.

10. A computer compiler for compiling, the computer compiler having instructions stored on a computer storage medium for causing a computer to execute a method comprising:

generating intermediate codes from a source program written in a high-level language;

optimizing the intermediate codes by converting a pass-by-value argument into a pass-by-reference argument, in the case where both of the following conditions are satisfied: there is no procedure that may indirectly call a procedure with pass-by-value argument, and the pass-by-value argument is not updated within a definition according to the procedure with pass-by-value argument; and converting the optimized intermediate codes into object codes, wherein the optimizing further includes:

extracting pass-by-value argument update information based on the intermediate codes, the information including at least the following: a procedure with pass-by-value argument; a procedure that directly calls the procedure with pass-by-value argument; a procedure that may indirectly call the procedure with pass-by-value argument; a pass-by-value argument of the procedure with pass-by-value argument; and update judgment information indicating whether or not the pass-by-value argument is updated within the definition according to the procedure with pass-by-value argument; and converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

11. A computer-readable storage medium in which a compiler is stored for causing a computer to execute a method comprising:

generating intermediate codes from a source program written in a high-level language;

optimizing the intermediate codes by converting a pass-by-value argument into a pass-by-reference argument, in the case where both of the following conditions are satisfied: there is no procedure that may indirectly call a procedure with pass-by-value argument, and the pass-by-value argument is not updated within a definition according to the procedure with pass-by-value argument; and converting the optimized intermediate codes into object codes, wherein the optimizing further includes:

extracting pass-by-value argument update information based on the intermediate codes, the information including at least the following: a procedure with pass-by-value argument; a procedure that directly calls the procedure with pass-by-value argument; a procedure that may indirectly call the procedure with pass-by-value argument; a pass-by-value argument of the procedure with pass-by-value argument; and update judgment information indicating whether or not the pass-by-value argument is updated within the definition according to the procedure with pass-by-value argument; and converting the procedure that calls a procedure with pass-by-value argument into the procedure that calls a procedure with pass-by-reference, in the case where the pass-by-value argument update information indicates that there is no procedure that may indirectly call a procedure with pass-by-value argument, and the pass-by-value argument is not undated within the definition according to the procedure with pass-by-value argument.

12. A compiler apparatus for compiling, the compiler apparatus having instructions stored on a storage medium for causing the compiler apparatus to convert a source program written in a high-level language into object codes, the compiler apparatus comprising:

an intermediate code generation unit operable to generate intermediate codes from the source program;

an optimization unit operable to optimize the intermediate codes by converting a pass-by-value argument into a pass-by-reference argument, in the case where both of the following conditions are satisfied: there is no procedure that may indirectly call a procedure with pass-by-value argument, and the pass-by-value argument is not updated within a definition according to the procedure with pass-by-value argument; and an object code conversion unit operable to convert the optimized intermediate codes into object codes, wherein the optimization unit includes:

a pass-by-value argument update information extraction unit operable to extract pass-by-value argument update information based on the intermediate codes, the information at least including a procedure with pass-by-value argument; a procedure that directly calls the procedure with pass-by-value argument; a pass-by-value argument of the procedure with pass-by-value argument; and update judgment information indicating whether or not the pass-by-value argument is updated within the definition according to the procedure with pass-by-value argument; and a conversion unit operable to convert a procedure that calls a procedure with pass-by-value argument into a procedure that calls a procedure with pass-by-reference, in the case where the pass-by-value argument update information indicates that there is no procedure that may indirectly call a procedure with pass-by-value argument, and the pass-by-value argument is not updated within the definition according to the procedure with pass-by-value argument.

13. The compiler apparatus according to claim 12, wherein the optimization unit optimizes the intermediate codes by converting an argument passing with the use of pass-by-value argument into an argument passing with the use of pass-by-reference argument, in the case where both of the following conditions are satisfied: there is no procedure that may indirectly call a procedure with pass-by-value argument, and the pass-by-value argument is not updated within the definition according to the procedure with pass-by-value argument.

14. The compiler apparatus according to claim 13, further comprising:

an optimization unit operable to optimize the intermediate codes by converting, for the procedure with pass-by-value argument, an argument passing with the use of pass-by-value into an argument passing with the use of pass-by-reference argument.

15. The compiler apparatus according to claim 12, wherein when it is not specified to forcedly convert a procedure that directly calls a procedure with pass-by-value argument into a procedure that directly calls a procedure with pass-by-reference argument, the conversion unit converts, the procedure that directly calls a procedure with pass-by-value into a procedure that directly calls a procedure with pass-by-reference argument, in the case where the pass-by-value argument update information indicates that there is no procedure that may indirectly call a procedure with pass-by-value argument, and the pass-by-value argument is not updated within the definition according to the procedure with pass-by-value argument.

16. The compiler apparatus according to claim 12, wherein in the case where it is specified to forcedly convert a procedure that calls a procedure with pass-by-value into a procedure that calls a procedure with pass-by-reference argument, the conversion unit performs, based on the pass-by-value argument update information, the following conversions as specified for the procedure with pass-by-value: the procedure that directly calls a procedure with pass-by-value argument is converted into the procedure that directly calls a procedure with pass-by-reference argument; and the procedure that may indirectly call a procedure with pass-by-value argument is converted into the procedure that may indirectly call a procedure with pass-by-value reference.

17. The compiler apparatus according to claim 12, wherein the optimization unit optimizes the intermediate codes by converting an argument passing with the use of pass-by-value argument into an argument passing with the use of pass-by-reference argument, in the case where both of the following conditions are satisfied: the procedure that may indirectly call a procedure with pass-by-value argument, and the pass-by-value argument is not updated within the definition according to the procedure with pass-by-value argument.

18. The compiler apparatus according to claim 17, wherein when it is not specified to forcedly convert an argument passing with the use of pass-by-value into an argument passing that uses pass-by-reference, for the procedure with pass-by-value argument, the conversion unit converts an argument passing with the use of pass-by-value into an argument passing with the use of pass-by-reference, in the case where the pass-by-value argument update information indicates that there is no procedure tat may indirectly call a procedure with pass-by-value argument, and the pass-by-value argument is not updated within the definition according to the procedure with pass-by-value argument.

19. The compiler apparatus according to claim 17, wherein when it is specified to forcedly convert, for the procedure with pass-by-value argument, an argument passing with the use of pass-by-value into an argument passing with the use of pass-by-reference, the conversion unit converts as specified for the procedure with pass-by-value, an argument passing with the use of pass-by-value into an argument passing with the use of pass-by-reference, based on the pass-by-value argument update information, and in the case where the pass-by-value argument is updated within the definition according to the procedure wit pass-by-value argument, an argument value is referred to from the converted pass-by-reference argument so as to generate a copy of the argument value, in the intermediate codes, at a location before a part where a value is actually updated, and the location where the copy is generated is set as a reference.

* * * * *